(12) United States Patent
Onishi

(10) Patent No.: US 8,687,205 B2
(45) Date of Patent: *Apr. 1, 2014

(54) OPTICAL DETECTION DEVICE, DISPLAY DEVICE, AND ELECTRONIC APPARATUS

(75) Inventor: Yasunori Onishi, Shiojiri (JP)

(73) Assignee: Seiko Epson Corporation (JP)

( * ) Notice: Subject to any disclaimer, the term of this patent is extended or adjusted under 35 U.S.C. 154(b) by 264 days.

This patent is subject to a terminal disclaimer.

(21) Appl. No.: 13/106,363

(22) Filed: May 12, 2011

(65) Prior Publication Data

US 2011/0279827 A1    Nov. 17, 2011

(30) Foreign Application Priority Data

May 13, 2010  (JP) ................................. 2010-110875

(51) Int. Cl.
    *G01B 11/14* (2006.01)
(52) U.S. Cl.
    USPC ............................ 356/614; 345/173; 345/690
(58) Field of Classification Search
    USPC .................................. 356/614; 345/173, 690
    See application file for complete search history.

(56) References Cited

U.S. PATENT DOCUMENTS

| | | | |
|---|---|---|---|
| 6,512,507 B1 | 1/2003 | Furihata et al. | |
| 8,259,309 B2 * | 9/2012 | Kiyose | 356/614 |
| 8,359,903 B2 | 1/2013 | Miklos et al. | |
| 2009/0273794 A1 * | 11/2009 | Ostergaard et al. | 356/614 |
| 2010/0271333 A1 | 10/2010 | Lai | |
| 2011/0255662 A1 * | 10/2011 | Shannon, Jr. | 378/44 |
| 2011/0279361 A1 * | 11/2011 | Onishi | 345/156 |

FOREIGN PATENT DOCUMENTS

| | | |
|---|---|---|
| JP | 11-345085 | 12/1999 |
| JP | 2001-142643 | 5/2001 |
| JP | 2009-008537 A | 1/2009 |

* cited by examiner

*Primary Examiner* — Tarifur Chowdhury
*Assistant Examiner* — Isiaka Akanbi
(74) *Attorney, Agent, or Firm* — Harness, Dickey & Pierce, P.L.C.

(57) ABSTRACT

An optical detection device includes: a first emitting unit that emits first emitting light in a radial pattern and having an intensity that differs in accordance with an emitting direction; a second emitting unit that emits second emitting light in a radial pattern and having an intensity that differs in accordance with an emitting direction; a light receiving unit that receives first reflection light acquired by reflecting the first emitting light emitted from the first emitting unit off an object and second reflection light acquired by reflecting the second emitting light emitted from the second emitting unit off the object; and a detection unit that detects a position of the object based on a result of the light reception in the light receiving unit.

17 Claims, 15 Drawing Sheets

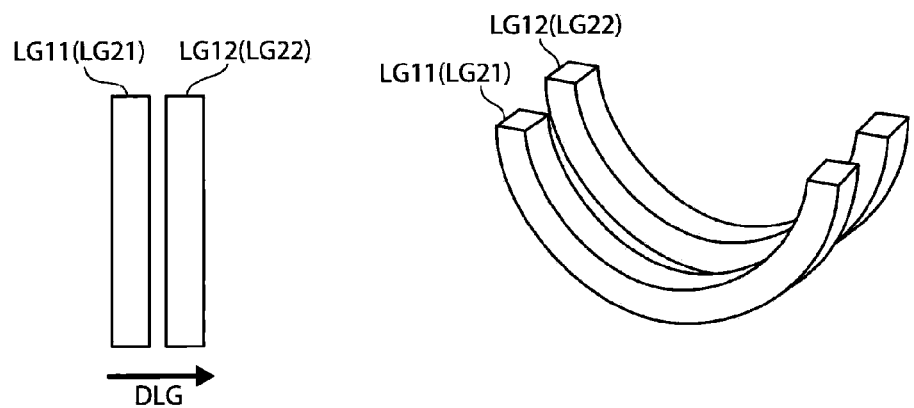
FIG. 6
FIG. 7A
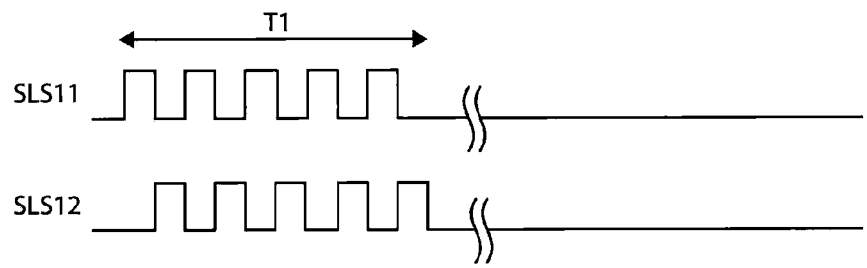
FIG. 7B
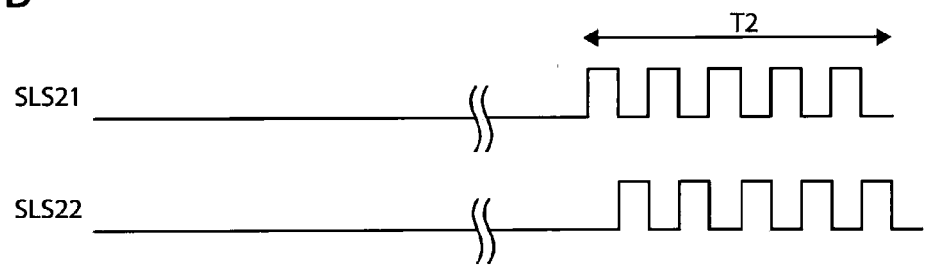

OPTICAL DETECTION DEVICE, DISPLAY DEVICE, AND ELECTRONIC APPARATUS

This application claims priority to Japanese Patent Application No. 2010-110875 filed May 13, 2010 which is hereby expressly incorporated by reference herein in its entirety.

BACKGROUND

1. Technical Field

The present invention relates to an optical detection device, a display device, and an electronic apparatus.

2. Related Art

Recently, a display device provided with a position detecting function in which a touch panel is disposed on the front side of a display unit has been used in electronic apparatuses such as cellular phones, personal computers, car navigation devices, ticket-vending machines, and banking terminals. With such a display device, a user can touch an icon or the like included in a display image or input information while referring to the image displayed on the display unit. Exemplary known position detecting methods using such a touch panel include resistance and capacitance types.

On the other hand, the display area of a projection-type display device (projector) or a display device for a digital signature is wider than that of the display device of a cellular phone or a personal computer. Accordingly, in such display devices, it is difficult to realize position detection using the resistance-type touch panel or the capacitance-type touch panel described above.

Known general technologies relating to a position detecting device used for a projection-type display device include, for example, the technologies disclosed in JP-A-11-345085 and JP-A-2001-142643. However, in this type of position detecting device, there are problems such as an increase in the size of the system.

SUMMARY

An advantage of some aspects of the invention is that it provides an optical detection device, a display device, and an electronic apparatus capable of detecting the position of an object in a broad range.

According to an aspect of the invention, there is provided an optical detection device including: a first emitting unit that emits first emitting light in a radial pattern and having an intensity that differs in accordance with an emitting direction; a second emitting unit that emits second emitting light in a radial pattern and having an intensity that differs in accordance with an emitting direction; a light receiving unit that receives first reflection light acquired by reflecting the first emitting light emitted from the first emitting unit off an object and second reflection light acquired by reflecting the second emitting light emitted from the second emitting unit off the object; and a detection unit that detects a position of the object based on a result of the light reception in the light receiving unit.

According to the above-described optical detection device, the first emitting light having an intensity that differs in accordance with an emitting direction, is emitted in a radial pattern from the first emitting unit, and the second emitting light having an intensity that differs in accordance with an emitting direction, is emitted in a radial pattern from the second emitting unit. Then, the first reflection light acquired by reflecting the first emitting light emitted from the first emitting unit off an object and the second reflection light acquired by reflecting the second emitting light emitted from the second emitting unit off the object are received by the light receiving unit, and the position of the object is detected based on the result of the light reception. According to the optical detection device having such a configuration, the position of the object can be detected by using the first reflection light acquired from the first emitting light emitted in a radial pattern and the second reflection light acquired from the second emitting light emitted in a radial pattern. Therefore, an optical detection device capable of detecting the position of an object in a broad range can be realized.

In the above-described optical detection device, the detection unit may detect the direction of the object with respect to the first emitting unit as a first direction based on a result of the light reception of the first reflection light, may detect the direction of the object with respect to the second emitting unit as a second direction based on a result of the light reception of the second reflection light, and may detect the position of the object based on the first direction and the second direction, which are detected, and a distance between the first emitting unit and the second emitting unit.

In such a case, by detecting the first direction that is the direction of the object with respect to the first emitting unit and the second direction that is the direction of the object with respect to the second emitting unit, the position of the object can be appropriately detected based on the first and second directions and the distance between the first and second emitting units.

In addition, in the above-described optical detection device, the first emitting unit and the second emitting unit may be arranged so as to be separated from each other in a direction along the surface of the detection area of the object.

In such a case, since the first emitting light having a radial pattern and the second emitting light having a radial pattern are emitted in the direction along the surface of the detection area of the object, the object can be detected in a broad range.

In addition, in the above-described optical detection device, the first emitting unit may include: a first light source unit that emits first source light; a second light source unit that emits second source light; a curve-shaped first light guide that guides the first source light incident to the light incident surface located on one end side along a curve-shaped light guiding path and guides the second source light incident to the light incident surface located on the other end side along a curve-shaped light guiding path; and a first emitting direction setting unit that receives the first source light or the second source light output from outer circumferential side of the first light guide and sets an emitting direction of the first emitting light to a direction from the inner circumferential side toward the outer circumferential side of the curve-shaped first light guide. In addition, the second emitting unit may include: a third light source unit that emits third source light; a fourth light source unit that emits fourth source light; a curve-shaped second light guide that guides the third source light incident to the light incident surface located on one end side along a curve-shaped light guiding path and guides the fourth source light incident to the light incident surface located on the other end side along a curve-shaped light guiding path; and a second emitting direction setting unit that receives the third source light or the fourth source light output from outer circumferential side of the second light guide and sets an emitting direction of the second emitting light to a direction from the inner circumferential side toward the outer circumferential side of the curve-shaped second light guide.

In such a case, for example, by disposing only one light guide for each emitting unit of the first and second emitting units, downsizing of the device can be achieved.

In addition, in the above-described optical detection device, the first emitting unit may include: a first light source unit that emits first source light; a second light source unit that emits second source light; a curve-shaped first light guide that guides the first source light incident to the light incident surface located on one end side along a curve-shaped light guiding path; a curve-shaped second light guide that guides the second source light incident to the light incident surface located on the other end side along a curve-shaped light guiding path; and a first emitting direction setting unit that receives the first source light output from the outer circumferential side of the first light guide or the second source light output from outer circumferential side of the second light guide and sets an emitting direction of the first emitting light to a direction from the inner circumferential side toward the outer circumferential side of the curve-shaped first light guide and the second light guide. In addition, the second emitting unit may include: a third light source unit that emits third source light; a fourth light source unit that emits fourth source light; a curve-shaped third light guide that guides the third source light incident to the light incident surface located on one end side along a curve-shaped light guiding path; a curve-shaped fourth light guide that guides the fourth source light incident to the light incident surface located on the other end side along a curve-shaped light guiding path; and a second emitting direction setting unit that receives the third source light output from the outer circumferential side of the third light guide or the fourth source light output from outer circumferential side of the fourth light guide and sets an emitting direction of the second emitting light to a direction from the inner circumferential side toward the outer circumferential side of the curve-shaped third light guide and the fourth light guide.

As in such a case, when a configuration is employed in which two light guides are disposed for each emitting unit of the first and second emitting units, the optical design such as adjustment of light emission characteristic can be simplified.

In addition, in the above-described optical detection device, it may be configured that a first emitting light intensity distribution is formed in a detection area of the object in accordance with emission of the first source light from the first light source unit of the first emitting unit, a second emitting light intensity distribution, which is different from the first emitting light intensity distribution, is formed in the detection area in accordance with emission of the second source light from the second light source unit of the first emitting unit, a third emitting light intensity distribution is formed in the detection area in accordance with emission of the third source light from the third light source unit of the second emitting unit, and a fourth emitting light intensity distribution, which is different from the third emitting light intensity distribution, is formed in the detection area in accordance with emission of the fourth source light from the fourth light source unit of the second emitting unit.

In such a case, the object can be detected based on the result of light reception at the time of forming the first emitting light intensity distribution and the result of light reception at the time of forming the second emitting light intensity distribution, and the object can be detected based on the result of light reception at the time of forming the third emitting light intensity distribution and the result of light reception at the time of forming the fourth emitting light intensity distribution. Accordingly, the object can be detected while the effects of external disturbing light such as circumferential light are reduced, whereby the detection accuracy can be improved.

In addition, in the above-described optical detection device, it may be configured such that the first emitting light intensity distribution is an intensity distribution in which the intensity of the emitting light decreases from one end portion toward the other end portion of the first emitting unit, the second emitting light intensity distribution is an intensity distribution in which the intensity of the emitting light decreases from the other end portion toward the one end portion of the first emitting unit, the third emitting light intensity distribution is an intensity distribution in which the intensity of the emitting light decreases from one end portion toward the other end portion of the second emitting unit, and the fourth emitting light intensity distribution is an intensity distribution in which the intensity of the emitting light decreases from the other end portion toward the one end portion of the second emitting unit.

In such a case, the emitting light intensity distribution in which the intensity differs in accordance with the emitting direction can be formed. Accordingly, by using the intensity distribution, the position of the object can be detected by performing a simple process.

In addition, the above-described optical detection device may further include a control unit that controls light emission of the first to fourth light source units, wherein the control unit allows the first light source unit and the second light source unit to alternately emit light during a first period and allows the third light source unit and the fourth light source unit to alternately emit light during a second period.

In such a case, the control unit can detect the direction of the object by forming the first and second emitting light intensity distributions by allowing the first and second light source units to alternately emit light during the first period. In addition, the control unit can detect the direction of the object by forming the third and fourth emitting light intensity distributions by allowing the third and fourth light source units to alternately emit light during the second period.

In addition, the above-described optical detection device may further include a control unit that controls light emission of the first to fourth light source units, wherein the control unit controls light emission of the first light source unit and the second light source unit such that a detected amount of light reception in the light receiving unit during a first light emission period, in which the first light source unit emits light, and a detected amount of light reception in the light receiving unit during a second light emission period, in which the second light source unit emits light, are the same, and controls light emission of the third light source unit and the fourth light source unit such that a detected amount of light reception in the light receiving unit during a third light emission period, in which the third light source unit emits light, and a detected amount of light reception in the light receiving unit during a fourth light emission period, in which the fourth light source unit emits light, are the same.

In such a case, the effects of disturbing light at the time of forming the first emitting light intensity distribution and the effects of the disturbing light at the time of forming the second emitting light intensity distribution can be offset by each other, or the effects of the disturbing light at the time of forming the third emitting light intensity distribution and the effects of the disturbing light at the time of forming the fourth emitting light intensity distribution can be offset by each other, whereby the detection accuracy can be improved. In addition, the light emission control for controlling the detected amount of light reception during the first light emission period and the detected amount of light reception during the second light emission period to be the same or the light emission control for controlling the detected amount of light reception during the third light emission period and the detected amount of light reception during the fourth light emission period to be the same may be light emission control that is performed through a reference light source unit.

In addition, in the above-described optical detection device, in a case where a direction from a first arrangement position that is an arrangement position of the first emitting unit toward a first position located on one end portion that defines the detection area of the object is a first direction, a direction from the first arrangement position toward a second position located on the other end portion that defines the detection area is a second direction, a direction from a second arrangement position that is an arrangement position of the second emitting unit toward the first position is a third direction, a direction from the second arrangement position toward the second position is a fourth direction, a direction from the first arrangement position toward the second arrangement position is a fifth direction, a direction opposite to the fifth direction is a sixth direction, a direction from the second arrangement position toward the first arrangement position is a seventh direction, and a direction opposite to the seventh direction is an eighth direction, it may be configured such that the first light source unit is arranged within a first direction range that is defined by the first direction and the sixth direction, the second light source unit is arranged within a second direction range that is defined by the second direction and the fifth direction, the third light source unit is arranged within a third direction range that is defined by the third direction and the seventh direction, and the fourth light source unit is arranged within a fourth direction range that is defined by the fourth direction and the eighth direction.

As above, when the first, second, third, and fourth light source units are arranged within the first, second, third, and fourth direction ranges, the position of the object that is present in the detection area defined by the first and second positions can be properly detected. In addition, the emitting light can be suppressed from being output in an unnecessary emitting direction and the emitting light intensity distribution can be easily set.

In addition, in the above-described optical detection device, in a case where a direction from a first arrangement position that is an arrangement position of the first emitting unit toward a first position located on one end portion that defines the detection area of the object is a first direction, a direction from the first arrangement position toward a second position located on the other end portion that defines the detection area is a second direction, a direction from a second arrangement position that is an arrangement position of the second emitting unit toward the first position is a third direction, and a direction from the second arrangement position toward the second position is a fourth direction, it may be configured such that the first emitting unit emits the first emitting light in a first emitting direction range including a direction range that is defined by the first direction and the second direction, and the second emitting unit emits the second emitting light in a second emitting direction range including a direction range that is defined by the third direction and the fourth direction.

In such a case, the first emitting unit emits the first emitting light in the first emitting direction range, and the second emitting unit emits the second emitting light in the second emitting direction range. Accordingly, the emitting light can be suppressed from being output in an unnecessary emitting direction and the emitting light intensity distribution can be easily set.

In addition, in the above-described optical detection device, each emitting unit of the first and second emitting units may further include an emitting direction regulating unit that regulates the emitting direction of the emitting light to be a direction along the surface of the detection area of the object.

In such a case, since the spreading-out (divergence) of the emitting light in the direction intersecting the detection area of the object can be suppressed, incorrect detection can be prevented.

In addition, in the above-described optical detection device, the emitting direction regulating unit may be a slit having a first slit face and a second slit face formed along the surface of the detection area.

In such a case, the emitting direction of the emitting light can be regulated to be the direction along the surface of the detection area of the object by only disposing the slit in the casing of the optical detection device.

In addition, in the above-described optical detection device, concave portions may be formed in the first slit face and the second slit face.

In such a case, since the surface reflection on the first and second slit faces can be suppressed, the spreading-out of the emitting light can be more effectively suppressed.

According to another aspect of the invention, there is provided a display device including any of the above-described optical detection devices.

According to another aspect of the invention, there is provided an electronic apparatus including any of the above-described optical detection devices.

BRIEF DESCRIPTION OF THE DRAWINGS

The invention will be described with reference to the accompanying drawings, wherein like numbers reference like elements.

FIG. 6 is an explanatory diagram illustrating the disposition of a light guide of the second configuration example.

FIGS. 7A and 7B illustrate a signal waveform of a detection technique according to this embodiment.

DESCRIPTION OF EXEMPLARY EMBODIMENTS

Hereinafter, preferred embodiments of the invention will be described in detail. The embodiments described below are not for the purpose of limiting the scope of the invention as defined by the claims. In addition, not all the configurations described in the embodiments are set as essential prerequisites of the invention.

1. Basic Configuration

Figure 1A:
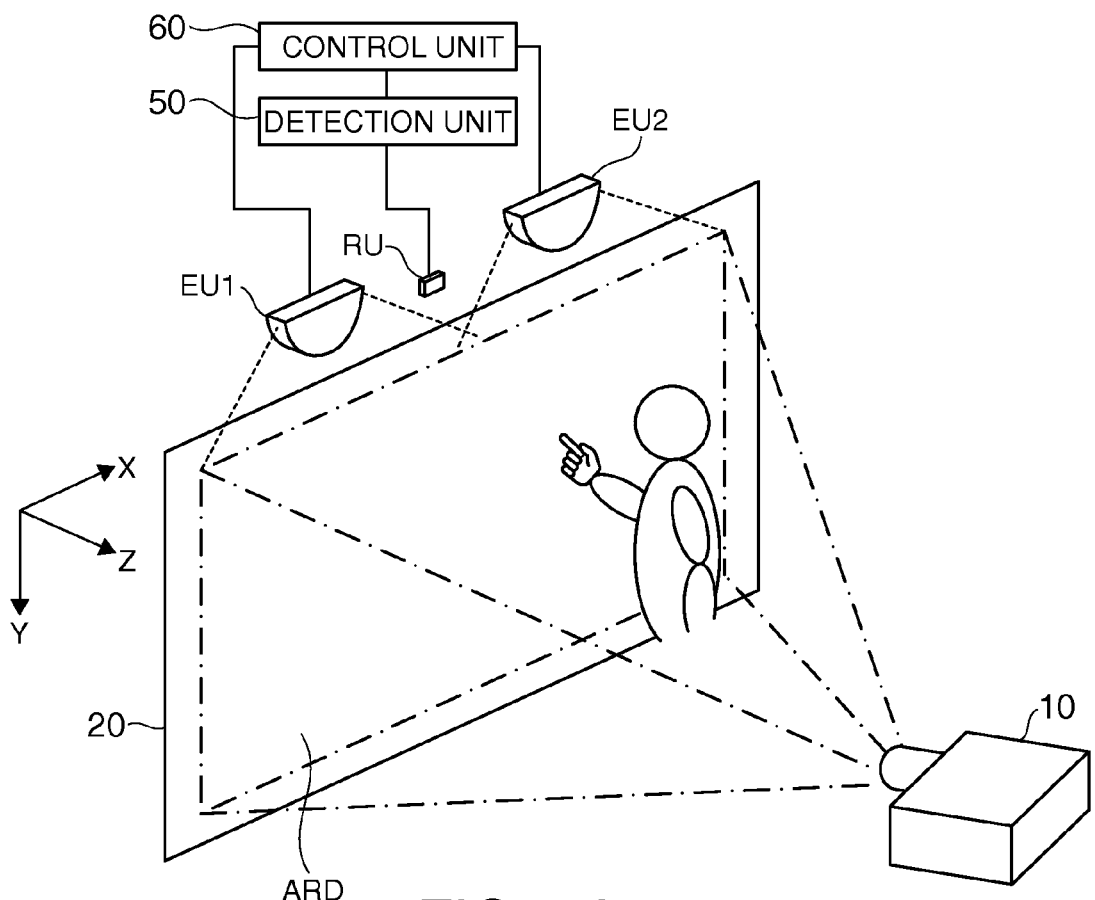
FIGS. 1A and 1B illustrate the basic configuration of an optical detection device and a display device according to one embodiment.
Figure 1B:
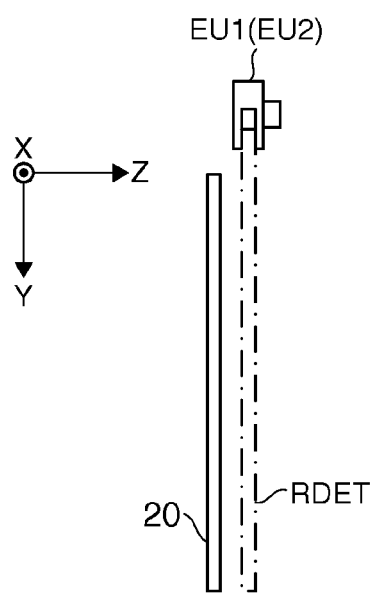

FIGS. 1A and 1B illustrate an example of the basic configurations of an optical detection device according to this embodiment and a display device or an electronic apparatus that uses the optical detection device. FIGS. 1A and 1B are examples in which the optical detection device according to this embodiment is applied to a liquid crystal projector or a projection-type display device (projector) known as a digital micro mirror device. In FIGS. 1A and 1B, axes intersecting with one another are set as an X axis, a Y-axis, and a Z-axis (in a broader sense, first, second, and third coordinate axes). To be more specific, the direction of the X-axis is set as the horizontal direction, the direction of the Y-axis is set as the vertical direction, and the direction of the Z axis is set as the depth direction.

The optical detection device according to this embodiment includes a first emitting unit EU1 and a second emitting unit EU2, a light receiving unit RU, and a detection unit 50. In addition, the optical detection device includes a control unit 60. The display device (electronic apparatus) according to this embodiment includes the optical detection device and a screen 20 (in a broader sense, a display unit). Furthermore, the display device (electronic apparatus) may include an image projecting device 10 (in a broader sense, an image generating device). In addition, the configurations of the optical detection device, the display device, and the electronic apparatus according to this embodiment are not limited to the configuration shown in FIGS. 1A and 1B. Thus, various modifications such as the omission of some of the constituent elements thereof or the addition of another constituent element can be made therein.

The image projecting device 10 projects image display light from a projection lens disposed on the front side of the casing toward the screen 20 in an enlarged scale. To be more specific, the image projecting device 10 generates display light of a color image and outputs the display light toward the screen 20 through the projection lens. Accordingly, the color image is displayed on a display area ARD of the screen 20.

The optical detection device according to this embodiment, as shown in FIG. 1B, optically detects an object such as a user's finger or a touch pen in a detection area RDET that is set to the front side (the side of the Z-axis direction) of the screen 20. Accordingly, the first and second emitting unit EU1 and EU2 of the optical detection device emit emitting light (detection light) that is used for detecting an object.

To be more specific, the first emitting unit EU1 emits first emitting light having an intensity (illuminance) that differs in accordance with the emitting direction, in a radial pattern (the direction of a normal line or the direction along the direction of the radius). The second emitting unit EU2 emits second emitting light having an intensity (illuminance) that differs in accordance with the emitting direction, in a radial pattern (the direction of a normal line or the direction along the direction of the radius). For example, the first emitting unit EU1 emits first emitting light in a radial pattern during a first period, and the second emitting unit EU2 emits second emitting light in a radial pattern during a second period. Accordingly, an emitting light intensity distribution in which the intensity differs in accordance with the emitting direction is formed in the detection area RDET. For example, during the first period, an emitting light intensity distribution in which the intensity differs in accordance with the emitting direction is formed in the detection area RDET by the emitting light emitted from the first emitting unit EU1. On the other hand, during the second period, an emitting light intensity distribution in which the intensity differs in accordance with the emitting direction is formed in the detection area RDET by the emitting light emitted from the second emitting unit EU2. Here, the detection area RDET is an area that is set along the X-Y plane to the side (the user side) of the screen 20 (the display unit) in the Z direction.

The light receiving unit RU receives reflection light that is acquired by reflecting the emitting light emitted from the first and second emitting units EU1 and EU2 off the object. For example, the light receiving unit RU receives first reflection light that is acquired by reflecting the first emitting light emitted from the first emitting unit EU1 off the object. In addition, the light receiving unit RU receives second reflection light that is acquired by reflecting the second emitting light emitted from the second emitting unit EU2 off the object. This light receiving unit RU can be implemented by a light receiving device such as a photo diode or a photo transistor. The detection unit 50 is electrically connected to the light receiving unit RU, for example.

The detection unit 50 detects at least the position of the object based on a result of the light reception in the light receiving unit RU. The function of this detection unit 50 can be realized by an integrated circuit device having an analog circuit or software (a program) that operates on a microcomputer. For example, the detection unit 50 converts a detection current that is generated by light receiving devices of the light receiving unit RU in accordance with the reception of the reflection light reflected from the object into a detection voltage and detects the position of the object based on the detection voltage as the result of the light reception.

To be more specific, the first and second emitting units EU1 and EU2 are arranged so as to be separated from each other by a predetermined distance in the direction along the surface of the detection area RDET of the object. For example, in FIGS. 1A and 1B, the first and second emitting units EU1 and EU2 are separated from each other by a predetermined distance along the X-axis direction.

The detection unit 50 detects the direction of the object with respect to the first emitting unit EU1 as a first direction based on a result of the light reception of the first reflection light acquired by reflecting the first emitting light emitted from the first emitting unit EU1 to be reflected from the object. In addition, the detection unit 50 detects the direction of the object with respect to the second emitting unit EU2 as a second direction based on a result of the light reception of the second reflection light acquired by reflecting the second emitting light emitted from the second emitting unit EU2 to be reflected from the object. Then, the position of the object is detected based on the detected first and second directions and the distance between the first and second emitting units. To be more specific, the X and Y coordinates of the detection area RDET on the XY-plane are detected.

The control unit 60 performs various control processes of the optical detection device. To be more specific, the control unit 60 performs control of the light emission of the light source unit included in each of the emitting units EU1 and EU2. The control unit 60 is electrically connected to the emitting units EU1 and EU2 and the detection unit 50. The function of the control unit 60 can be realized by an integrated circuit device, software operating on a microcomputer, or the like. For example, it is assumed that the emitting unit EU1 includes first and second light source units, and the emitting unit EU2 includes third and fourth light source units. In this case, the control unit 60 controls the first and second light source units of the emitting unit EU1 so as to alternately emit light during the first period during which the direction of the object with respect to the emitting unit EU1 is acquired. In addition, the control unit 60 controls the third and fourth light source units of the emitting unit EU2 so as to alternately emit light during the second period during which the direction of the object with respect to the emitting unit EU2 is acquired.

The optical detection device according to this embodiment is not limited to being applied to the projection-type display device shown in FIG. 1A and can be applied to various display devices mounted in various electronic apparatuses. As electronic apparatuses to which the optical detection device according to this embodiment can be applied, various apparatuses such as a personal computer, a car navigation apparatus, a ticket-venting machine, a mobile information terminal, and a banking terminal can be considered. Such an electronic apparatus, for example, may include a display unit (display device) that displays an image, an input unit that is used for inputting information, and a processing unit that performs various processes based on the input information.

2. Technique for Detecting an Object

Next, a technique for detecting an object according to this embodiment will be described in detail. Here, although the configuration and the operation of one emitting unit of the emitting units EU1 and EU2 shown in FIG. 1A will be described, the configuration and the operation of the other emitting unit are the same.

Figure 2A:
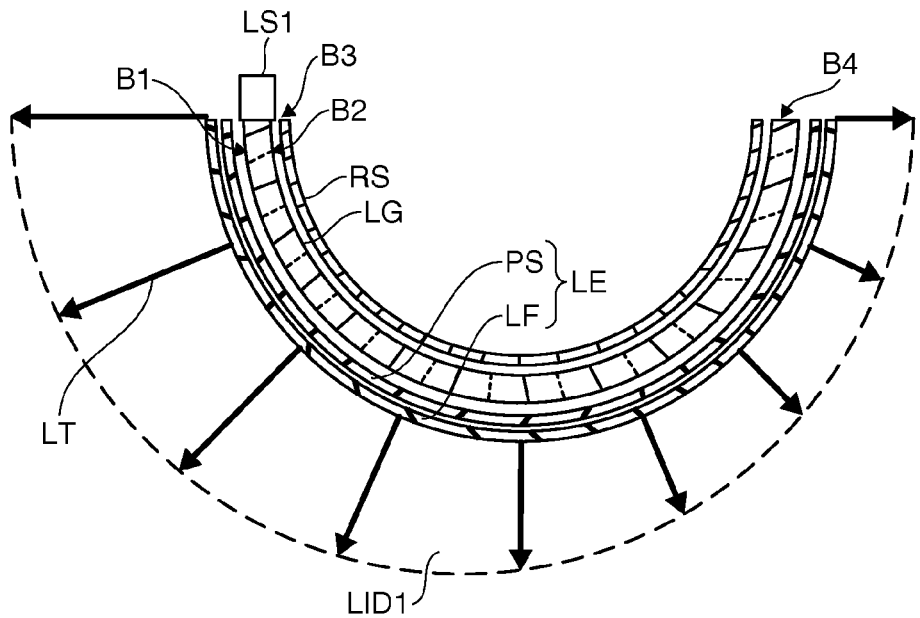
FIGS. 2A and 2B are explanatory diagrams illustrating a detection technique according to this embodiment.

As shown in FIG. 2A, each emitting unit (EU1 or EU2) of the optical detection device according to this embodiment includes a light source unit LS1, a light guide LG, and an emitting direction setting unit LE. In addition, the optical detection device includes a reflection sheet RS. The emitting direction setting unit LE includes an optical sheet PS and a louver film LF. Furthermore, various modifications such as the omission of some of the constituent elements and the addition of another constituent element may be made therein.

The light source unit LS1 emits source light and includes a light emitting device such as an LED (light emitting diode). This light source unit LS1, for example, emits source light that is infrared light (near-infrared light close to the visible light range). In other words, it is preferable that the source light emitted by the light source unit LS1 is light of a wavelength band that is efficiently reflected by an object such as a user's finger or a touch pen or light of a wavelength band that is not particularly included in the environmental light that becomes external disturbing light. To be more specific, infrared light having a wave length of about 850 nm that is light of a wavelength band having high reflectance for the surface of a human body or infrared light having a wavelength of about 950 nm that is not particularly contained in the environmental light is preferable.

The light guide LG (a light guiding member) guides the source light emitted by the light source unit LS1. For example, the light guide LG guides the source light emitted from the light source unit LS1 along a light guiding path having a curved shape, and the shape of the light guide is a curved shape. To be more specific, in FIG. 2A, the light guide LG has an arc shape. Although the light guide LG is formed in an arc shape having a center angle of 180 degrees in FIG. 2A, the shape of the light guide LG may be an arc having a center angle less than 180 degrees. The light guide LG is formed of a transparent resin member or the like such as acrylic resin or polycarbonate. The source light emitted from the light source unit LS1 is incident to a light incident surface arranged on one end side (the left side in FIG. 2A) of the light guide LG.

At least one of the outer circumferential side (the side denoted by B1) and the inner circumferential side (the side denoted by B2) of the light guide LG is processed so as to adjust the light emission efficiency of the source light emitted from the light guide LG. As the processing technique, various techniques such as a silk screen printing method in which reflective dots are printed, a molding method in which an unevenness is applied by a stamper or by injection, or a groove processing method can be employed.

The emitting direction setting unit LE (an emitting light emitting unit) that is implemented by the prism sheet PS and the louver film LF is disposed on the outer circumferential side of the light guide LG and receives the source light emitted from the outer circumferential side (an outer circumferential surface) of the light guide LG. Then, the emitting direction setting unit LE emits emitting light LT having an emitting direction set to the direction from the inner circumferential side (B2) toward the outer circumferential side (B1) of the curve-shaped (arc-shaped) light guide LG. In other words, the emitting direction setting unit LE, for example, sets (regulates) the direction of the source light emitted from the outer circumferential side of the light guide LG to the emitting direction along the direction of the normal line (the radial direction) of the light guide LG. Accordingly, the emitting light LT is emitted in a radial pattern in a direction from the inner circumferential side toward the outer circumferential side of the light guide LG.

The setting of the emitting direction of the emitting light LT is realized by the prism sheet PS and the louver film LF of the emitting direction setting unit LE. For example, the prism sheet PS sets the direction of the source light that is emitted with a low viewing angle from the outer circumferential side of the light guide LG to rise up on the side of the normal line direction and to have the peak of the light emission characteristic in the direction of the normal line. The louver film LF shields (cuts) light (light with a low viewing angle) in the directions other than the direction of the normal line. In addition, as will be described later, a diffusion sheet or the like may be arranged in the emitting direction setting unit LE. In addition, the reflection sheet RS is disposed on the inner circumferential side of the light guide LG. By arranging the reflection sheet RS on the inner circumferential side as above, the light emission efficiency of the source light toward the outer circumferential side can be enhanced.

As shown in FIG. 2A, by emitting the source light to the light incident surface that is one end side (B3) of the light guide LG using the light source unit LS1, a first emitting light intensity distribution LID1 is formed in a detection area (RDET shown in FIG. 1B) of an object. The first emitting light intensity distribution LID1 is an intensity distribution in which the intensity of the emitting light decreases from one end side (B3) of the light guide LG toward the other end side (B4) thereof. In other words, in FIG. 2A, the magnitude of a vector of the emitting light LT represents the intensity (illuminance), and the intensity of the emitting light LT is the highest on one end side (B3) of the light guide LG and is the lowest on the other end side (B4) thereof. From the one end side of the light guide LG toward the other end side thereof, the intensity of the emitting light LT monotonously decreases.

Figure 2B:
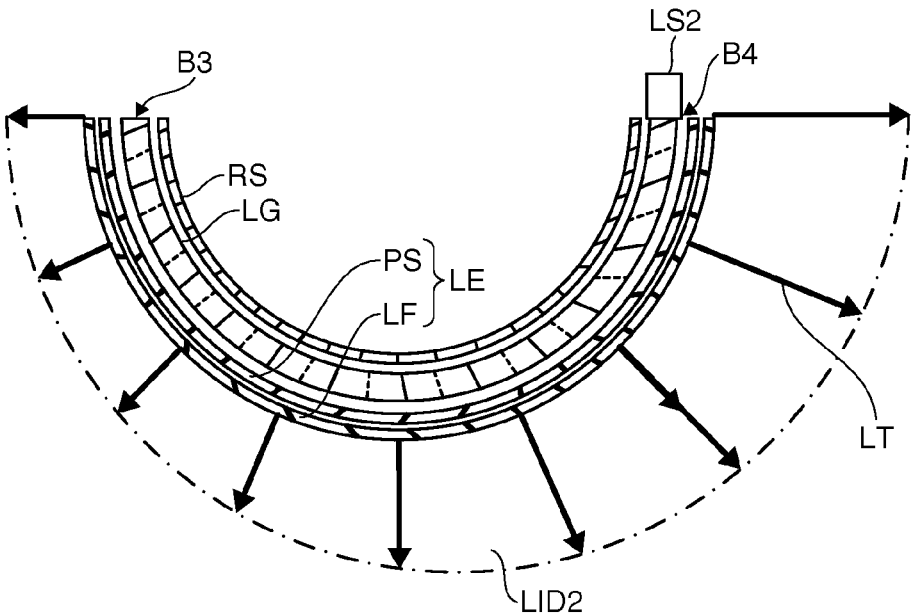

Meanwhile, as shown in FIG. 2B, by emitting the second source light to the light incident surface of the other end side (B4) of the light guide LG using the second light source unit LS2, a second emitting light intensity distribution LID2 is formed in the detection area. This second emitting light intensity distribution LID2, differently from the first emitting light intensity distribution LID1, is an intensity distribution in which the intensity of the emitting light decreases from the other end side (B4) of the light guide LG toward the one end side (B3) thereof. In other words, in FIG. 2B, the intensity of the emitting light LT is the highest on the other end side of the light guide LG and is the lowest on the one end side. In addition, from the other end side toward the one end side, the intensity of the emitting light LT monotonously decreases.

By forming such emitting light intensity distributions LID1 and LID2 and receiving reflection light, which is reflected from an object, of the emitting light having the emitting light intensity distributions, the object can be detected with high accuracy by suppressing the effects of external disturbing light such as environmental light to a minimum level. In other words, an infrared component that is included in the external disturbing light can be offset, and adverse effects of the infrared component on the detection of an object can be suppressed to a minimum level.

Figure 3A:
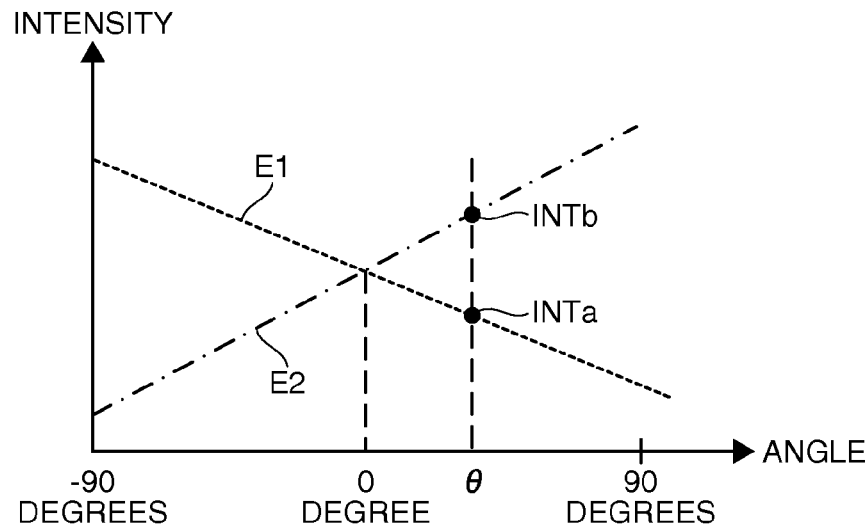
FIGS. 3A and 3B are explanatory diagrams illustrating a detection technique according to this embodiment.
Figure 3B:
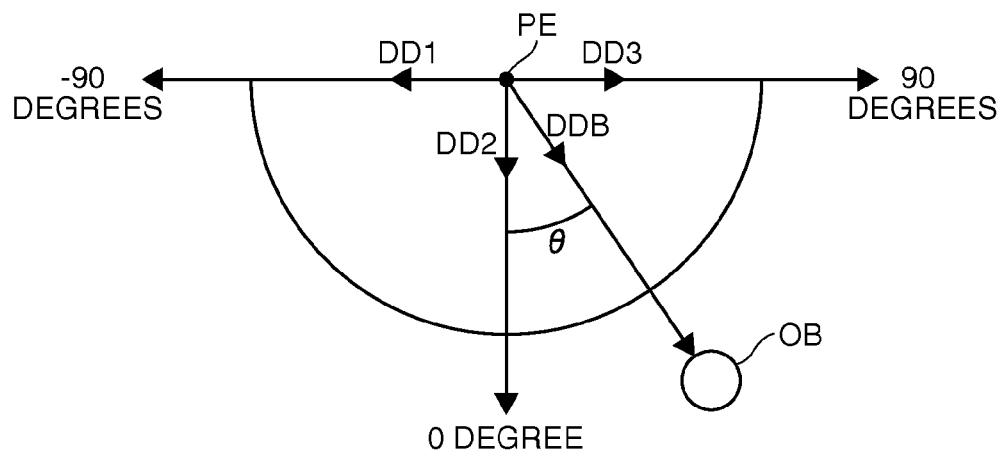

For example, E1 shown in FIG. 3A is a graph illustrating the relationship between the angle of the emitting direction of the emitting light LT and the intensity of the emitting light LT at the angle in the emitting light intensity distribution LID1 shown in FIG. 2A. Here, E1 shown in FIG. 3A has the highest intensity in a case where the emitting direction is the direction of DD1 (the leftward direction) shown in FIG. 3B. On the other hand, the intensity is the lowest in a case where the emitting direction is the direction of DD3 (the rightward direction) and is intermediate in the direction of DD2. To be more specific, the intensity of the emitting light monotonously decreases in accordance with a change in the angle from the direction DD1 to the direction DD3 and, for example, linearly changes. In FIG. 3B, the center position of the arc shape of the light guide LG is the arranged position PE of the optical detection device.

In addition, E2 shown in FIG. 3A is a graph illustrating the relationship between the angle of the emitting direction of the emitting light LT and the intensity of the emitting light LT at the angle in the emitting light intensity distribution LID2 shown in FIG. 2B. Here, E2 shown in FIG. 3A has the highest intensity in a case where the emitting direction is the direction of DD3 shown in FIG. 3B. On the other hand, the intensity is the lowest in a case where the emitting direction is the direction of DD1 and is intermediate in the direction of DD2. To be more specific, the intensity of the emitting light monotonously decreases in accordance with a change in the angle from the direction DD3 to the direction DD1 and, for example, linearly changes. Here in FIG. 3A, the relationship between the angle of the emitting direction and the intensity is represented as linear. However, this embodiment is not limited thereto, and, for example, the relationship may be a hyperbolic curve or the like.

As shown in FIG. 3B, it is assumed that an object OB is present in the direction DDB of an angle θ. Then, in a case where the emitting light intensity distribution LID1 is formed (in the case of E1) in accordance with light emission of the light source unit LS1 as shown in FIG. 2A, as illustrated in FIG. 3A, the intensity at the position of the object OB that is present in the direction of DDB (angle θ) is INTa. On the other hand, in a case where the emitting light intensity distribution LID2 is formed (in the case of E2) in accordance with light emission of the light source unit LS2 as shown in FIG. 2B, the intensity at the position of the object OB that is present in the direction of DDB is INTb.

Figure 4:
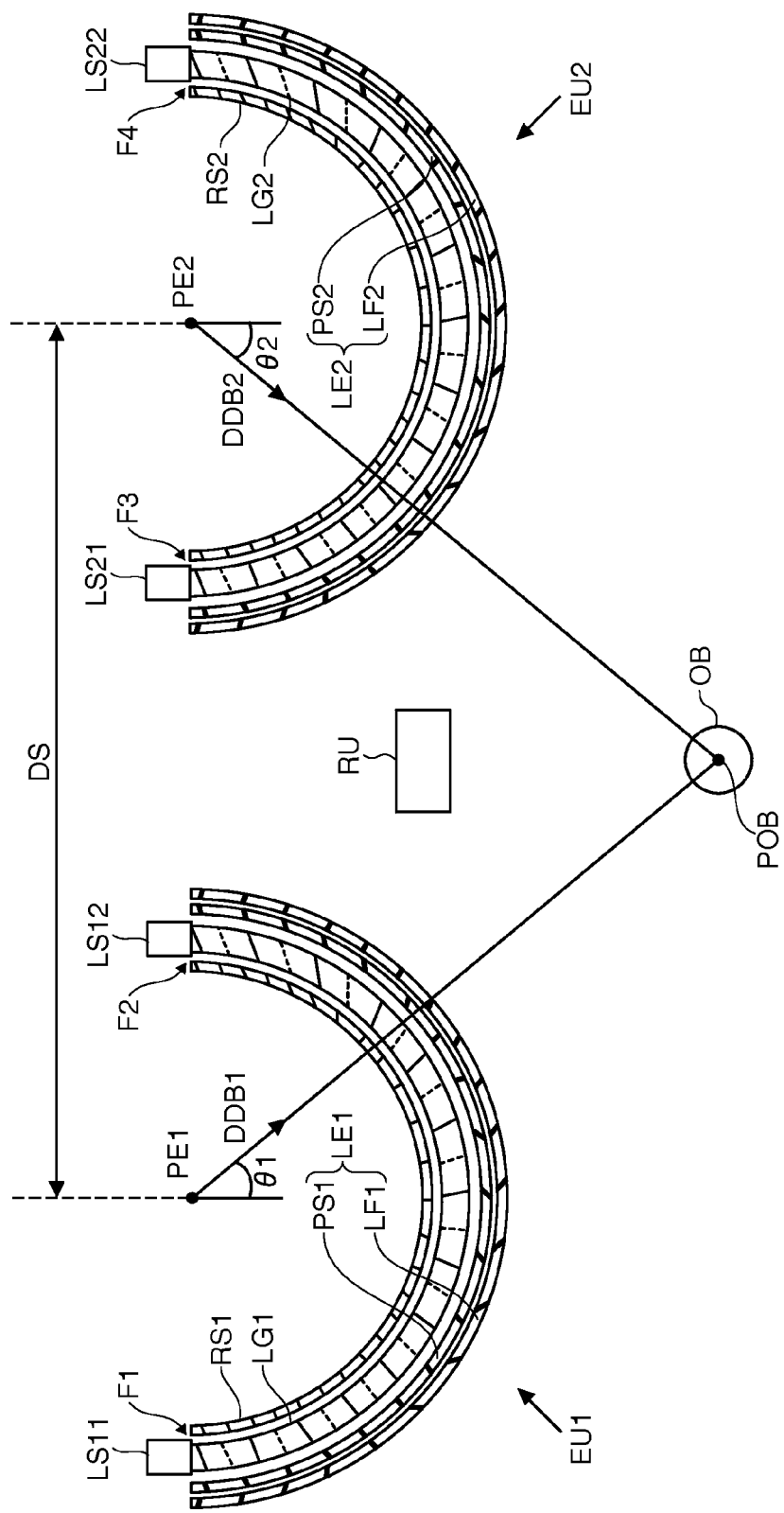
FIG. 4 is a first configuration example of an optical detection device according to this embodiment.
Figure 5:
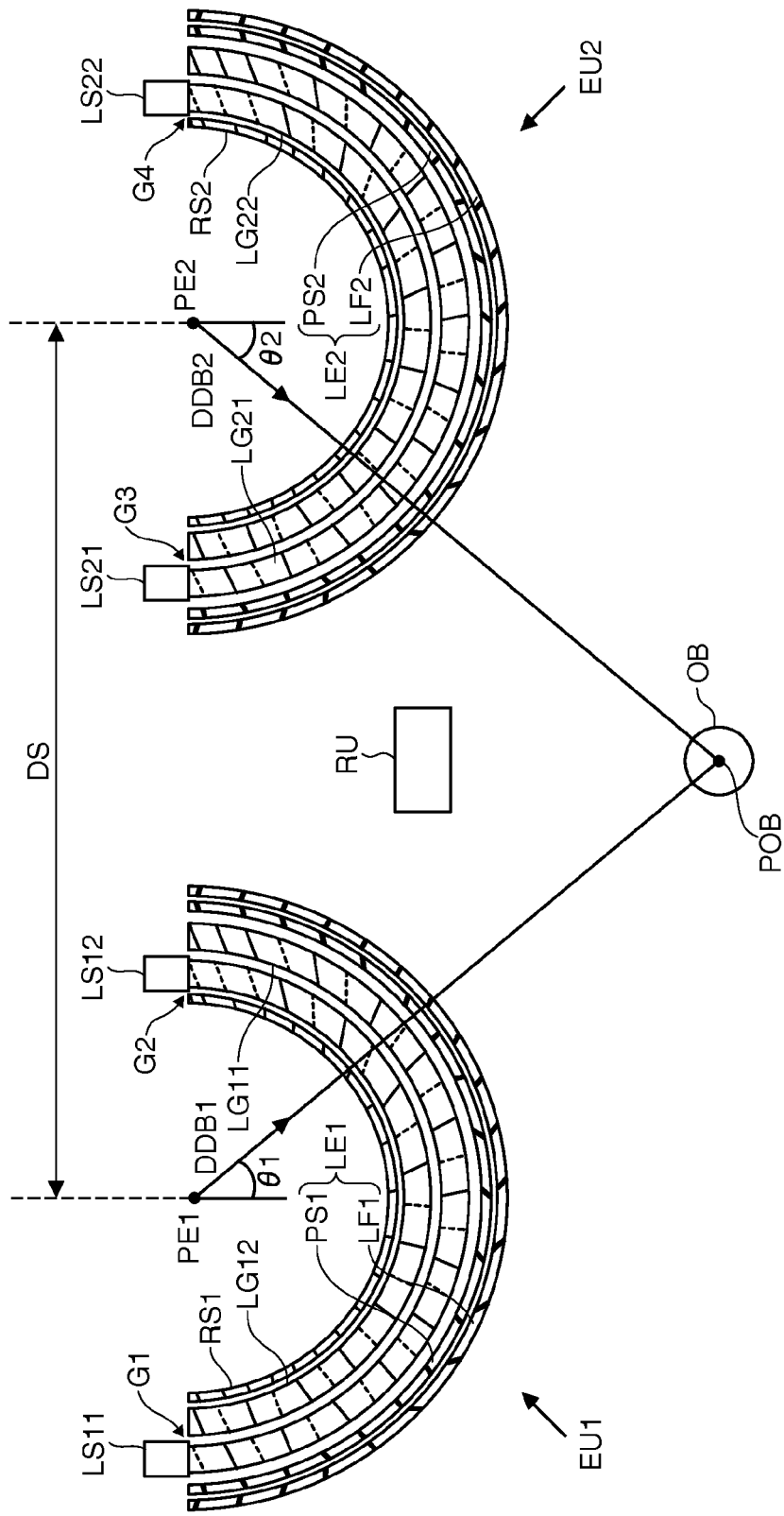
FIG. 5 is a second configuration example of an optical detection device according to this embodiment.

Accordingly, by acquiring the relationship between the intensities INTa and INTb, the direction DDB (angle θ) in which the object OB is located can be specified. Then, for example, as shown in FIGS. 4 and 5 to be described later, by arranging two emitting units EU1 and EU2 and acquiring the directions DDB1 (θ1) and DDB2 (θ2) of the object OB with respect to the emitting units EU1 and EU2, the position of object OB can be specified based on the directions DDB1 and DDB2 and a distance DS between the emitting units EU1 and EU2.

In order to acquire the relationship between the intensities INTa and INTb, the light receiving unit RU shown in FIG. 1A receives the reflection light (first reflection light) of the object OB at a time when the emitting light intensity distribution LID1 as shown in FIG. 2A is formed, in this embodiment. In a case where the detected amount of light reception at this time is Ga, Ga corresponds to the intensity INTa. In addition, the light receiving unit RU receives the reflection light (second reflection light) of the object OB at a time when the emitting light intensity distribution LID2 as shown in FIG. 2B is formed. In a case where the detected amount of light reception of the reflection light is Gb, Gb corresponds to the intensity INTb. Accordingly, when the relationship between the detected amounts Ga and Gb of light reception is acquired, the relationship between the intensities INTa and INTb is acquired, and the direction DDB in which the object OB is located can be acquired.

For example, a control amount (for example, a current amount), a transformation coefficient, and an emitted amount of light of the light source unit LS1 shown in FIG. 2A are denoted by Ia, k, and Ea. In addition, a control amount (for example, a current amount), a transformation coefficient, and an emitted amount of light of the light source unit LS2 shown in FIG. 2B are denoted by Ib, k, and Eb. Then, the following Equations (1) and (2) are satisfied.

$$Ea = k \cdot Ia \quad (1)$$

$$Eb = k \cdot Ib \quad (2)$$

In addition, the attenuation coefficient of the source light (first source light) emitted from the light source unit LS1 is denoted by fa, and the detected amount of light reception of the reflection light (first reflection light) corresponding to this source light is denoted by Ga. Furthermore, the attenuation coefficient of the source light (second source light) emitted from the light source unit LS2 is denoted by fb, and the detected amount of light reception of the reflection light (second reflection light) corresponding to this source light is denoted by Gb. Then, the following Equations (3) and (4) are satisfied.

$$Ga = fa \cdot Ea = fa \cdot k \cdot Ia \quad (3)$$

$$Gb = fb \cdot Eb = fb \cdot k \cdot Ib \quad (4)$$

Thus, the ratio between the detected amounts Ga and Gb of light reception can be represented as in the following Equation (5).

$$Ga/Gb = (fa/fb) \cdot (Ia/Ib) \quad (5)$$

Here, "Ga/Gb" can be specified based on the result of the light reception in the light receiving unit RU, and "Ia/Ib" can be specified based on the amount of control of the control unit 60 for the emitting unit. The intensities INTa and INTb shown in FIG. 3A and the attenuation coefficients fa and fb have a unique relationship. For example, in a case where the attenuation coefficients fa and fb have small values, and the attenuation amounts are large, the intensities INTa and INTb are small. On the other hand, in a case where the attenuation coefficients fa and fb have large values, and the attenuation amounts are small, the intensities INTa and INTb are large. Accordingly, by acquiring the ratio "fa/fb" between the attenuation ratios by using the above-described Equation (5), the direction and the position, of an object can be acquired.

To be more specific, one amount of control Ia is fixed to Im, and the other amount of control Ib is controlled such that the ratio "Ga/Gb" between the detected amounts of light reception is one. For example, as illustrated in FIG. 7A to be described later, the light source units LS1 and LS2 are controlled so as to be alternately turned on with opposite phases, the waveform of the detected amount of light reception is analyzed, and the other amount of control Ib is controlled such that the detected waveform is not observed (Ga/Gb=1). Then, based on the other amount of control Ib=Im·(fa/fb) at this time, the ratio "fa/fb" between the attenuation coefficients is acquired, and the direction and the position, of the object are acquired.

In addition, as in the following Equations (6) and (7), a control operation may be performed such that Ga/Gb=1, and a value acquired by adding Ia and Ib is constant.

$$Ga/Gb=1 \quad (6)$$

$$Im=Ia+Ib \quad (7)$$

Then, by substituting Equations (6) and (7) into Equation (5), the following Equation (8) is satisfied.

$$Ga/Gb=1=(fa/fb)\cdot(Ia/Ib)=(fa/fb)\cdot\{(Im-Ib)/Ib\} \quad (8)$$

By using Equation (8), Ib can be represented in the following Equation (9).

$$Ib=\{fa/(fa+fb)\}\cdot Im \quad (9)$$

Here, when it is set such that α=fa/(fa+fb), Equation (9) can be represented as the following Equation (10), and the ratio "fa/fb" between the attenuation coefficients can be represented in the following Equation (11) by using α.

$$Ib=\alpha\cdot Im \quad (10)$$

$$fa/fb=\alpha/(1-\alpha) \quad (11)$$

Accordingly, when it is controlled such that Ga/Gb=1 and a value acquired by adding Ia and Ib is equal to a constant value Im, α can be acquired by using Equation (10) using Ib and Im at that time, and the ratio "fa/fb" between the attenuation coefficients can be acquired by substituting the acquired α into Equation (11). Therefore, the direction and the position of the object can be acquired. In addition, by controlling Ga/Gb=1 and a value acquired by adding Ia and Ib to be constant, the effects of the external disturbing light can be offset, whereby the detection accuracy is improved.

As above, the technique for detecting the direction and the position of an object by alternately forming the emitting light intensity distribution LID1 shown in FIG. 2A and the emitting light intensity distribution LID2 shown in FIG. 2B has been described. However, in a case where a decrease in the detection accuracy is allowed to some degree, it is possible to acquire the direction and the position of an object by forming one of the emitting light intensity distribution LID1 shown in FIG. 2A and the emitting light intensity distribution LID2 shown in FIG. 2B.

3. Configuration Example

Next, first and second configuration examples of an optical detection device according to this embodiment will be described. FIG. 4 shows the first configuration example of an optical detection device according to this embodiment.

According to the first configuration example, a first emitting unit EU1 includes first and second light source units LS11 and LS12, a first light guide LG1, and a first emitting direction setting unit LE1. The first light source unit LS11, as denoted by F1 shown in FIG. 4, is disposed on one end side of the first light guide LG1 and emits first source light. In addition, the second light source unit LS12, as denoted by F2, is disposed on the other end side of the first light guide LG1 and emits second source light.

The first light guide LG1 having a curve shape guides the first source light that is emitted from the first light source unit LS11 and is incident to the light incident surface disposed on one end side (F1) along a curve-shaped light guiding path. In addition, the first light guide LG1 guides the second source light that is emitted from the second light source unit LS12 and is incident to the light incident surface disposed on the other end side (F2) along a curve-shaped light guiding path.

The first emitting direction setting unit LE1 receives the first source light or the second source light that is emitted from the outer circumferential side of the first light guide LG1 and sets the emitting direction of the first emitting light to the direction from the inner circumferential side to the outer circumferential side of the curve-shaped first light guide LG1. This first emitting direction setting unit LE1, for example, is configured by a prism sheet PS1 and a louver film LF1.

In addition, the second emitting unit EU2 includes third and fourth light source units LS21 and LS22, a second light guide LG2, and a second emitting direction setting unit LE2. The third light source unit LS21, as denoted by F3 shown in FIG. 4, is disposed on one end side of the second light guide LG2 and emits third source light. In addition, the fourth light source unit LS22, as denoted by F4, is disposed on the other end side of the second light guide LG2 and emits fourth source light.

The second light guide LG2 having a curve shape guides the third source light that is emitted from the third light source unit LS21 and is incident to the light incident surface disposed on one end side (F3) along a curve-shaped light guiding path. In addition, the second light guide LG2 guides the fourth source light that is emitted from the fourth light source unit LS22 and is incident to the light incident surface disposed on the other end side (F4) along a curve-shaped light guiding path.

Then, the second emitting direction setting unit LE2 receives the third source light or the fourth source light that is emitted from the outer circumferential side of the second light guide LG2 and sets the emitting direction of the second emitting light to the direction from the inner circumferential side to the outer circumferential side of the curve-shaped second light guide LG2. This second emitting direction setting unit LE2, for example, is configured by a prism sheet PS2 and a louver film LF2.

FIG. 5 shows the second configuration example of the optical detection device. According to the second configuration example, a first emitting unit EU1 includes a first light source unit LS11, a second light source unit LS12, a first light guide LG11, a second light guide LG12, and a first emitting direction setting unit LE1.

The first light guide LG11 guides the first source light that is emitted from the first light source unit LS11 and is incident to the light incident surface disposed on one end side (G1) along a curve-shaped light guiding path.

The second light guide LG12 guides the second source light that is emitted from the second light source unit LS12 and is incident to the light incident surface disposed on the other end side (G2) along a curve-shaped light guiding path.

The first emitting direction setting unit LE1 receives the first source light that is emitted from the outer circumferential side of the first light guide LG11 or the second source light that is emitted from the outer circumferential side of the second light guide LG12 and sets the emitting direction of the first emitting light to the direction from the inner circumferential side to the outer circumferential side of the curve-shaped first light guide LG11 and the second light guide LG12.

In addition, the second emitting unit EU2 includes a third light source unit LS21, a fourth light source unit LS22, a third light guide LG21, a fourth light guide LG22, and a second emitting direction setting unit LE2.

The third light guide LG21 guides the third source light that is emitted from the third light source unit LS21 and is incident to the light incident surface disposed on one end side (G3) along a curve-shaped light guiding path.

In addition, the fourth light guide LG22 guides the fourth source light that is emitted from the fourth light source unit LS22 and is incident to the light incident surface disposed on the other end side (G4) along a curve-shaped light guiding path.

Then, the second emitting direction setting unit LE2 receives the third source light that is emitted from the outer circumferential side of the third light guide LG21 or the fourth source light that is emitted from the outer circumferential side of the fourth light guide LG22 and sets the emitting direction of the second emitting light to the direction from the inner circumferential side to the outer circumferential side of the curve-shaped third light guide LG21 and the fourth light guide LG22.

In the second configuration example shown in FIG. 5, for easy understanding of the drawing, the light guides LG11 and LG12 of the emitting unit EU1 are drawn so as to be aligned in the direction of the radius of the arc shape. In addition, the light guides LG21 and LG22 of the emitting unit EU2 are drawn so as to be aligned in the direction of the radius of the arc shape. However, the light guides LG11 and LG12 or the light guides LG21 and LG22 are actually arranged so as to have the positional relationship as shown in FIG. 6. In other words, the light guides LG11 and LG12 are arranged so as to be aligned in the direction DLG intersecting (being orthogonal to) a surface that is along the direction in which the light guides LG11 and LG12 and the emitting direction setting unit LE1 are aligned. In addition, the light guides LG21 and LG22 are arranged so as to be aligned in the direction DLG intersecting (being orthogonal to) a surface that is along the direction in which the light guides LG21 and LG22 and the emitting direction setting unit LE2 are aligned. For example, the light guides LG11 and LG12 (LG21 and LG22) are arranged along the direction (Z-axis direction) intersecting (being orthogonal to) the surface (a surface parallel to the XY plane) of the detection area RDET shown in FIG. 1B. Accordingly, since the light guides LG11 and LG12 (LG21 and LG22) can be compactly housed in each emitting unit of the optical detection device, an increase in the scale of the optical detection device can be suppressed.

As above, while each of the emitting units EU1 and EU2 has one light guide in the first configuration example shown in FIG. 4, each of the emitting units EU1 and EU2 has two light guides in the second configuration example shown in FIG. 5.

In any of the first and second configuration examples shown in FIGS. 4 and 5, the light emission control is implemented as below. To be more specific, as the light source unit LS11 of the emitting unit EU1 emits the first source light, the first emitting light intensity distribution is formed (set) in the detection area of the object. In addition, as the light source unit LS12 of the emitting unit EU1 emits the second source light, the second emitting light intensity distribution, which is different from the first emitting light intensity distribution is formed in the detection area. In this case, the first emitting light intensity distribution, as shown in FIG. 2A, is an intensity distribution in which the intensity of the emitting light decreases from one end side (F1 or G1) to the other end side (F2 or G2) of the emitting unit EU1. On the other hand, the second emitting light intensity distribution, as shown in FIG. 2B, is an intensity distribution in which the intensity of the emitting light decreases from the other end side (F2 or G2) to the one end side (F1 or G1) of the emitting unit EU1.

In any of the first and second configuration examples shown in FIGS. 4 and 5, as the light source unit LS21 of the emitting unit EU2 emits the third source light, the third emitting light intensity distribution is formed in the detection area. In addition, as the light source unit LS22 of the emitting unit EU2 emits the fourth source light, the fourth emitting light intensity distribution, which is different from the third emitting light intensity distribution is formed in the detection area. In this case, the third emitting light intensity distribution, as shown in FIG. 2A, is an intensity distribution in which the intensity of the emitting light decreases from one end side (F3 or G3) to the other end side (F4 or G4) of the emitting unit EU2. On the other hand, the fourth emitting light intensity distribution, as shown in FIG. 2B, is an intensity distribution in which the intensity of the emitting light decreases from the other end side (F4 or G4) to the one end side (F3 or G3) of the emitting unit EU2.

Next, differences between the first configuration example shown in FIG. 4 and the second configuration example shown in FIG. 5 will be described in detail. Here, although the emitting unit EU1 of the emitting units EU1 and EU2 will be described as an example, the same applies to the emitting unit EU2.

According to the first configuration example shown in FIG. 4, only one light guide LG1 is disposed in the emitting unit EU1 (EU2). Therefore, there is an advantage that downsizing of the optical detection device can be achieved.

On the other hand, in the second configuration example shown in FIG. 5, the light guide LG11 and the light source unit LS11 that emits light so as to be incident thereto are arranged, and the light guide LG12 and the light source unit LS12 that emits light so as to be incident thereto are arranged. Then, by alternately turning on the light source units LS11 and LS12 with opposite phases as shown in FIG. 7A to be described later, the state shown in FIG. 2A and the state shown in FIG. 2B are alternately formed. Then, the reflection light of an object is received, and the direction of the object is specified based on the result of the light reception.

According to the second configuration example, the optical design of the light guides LG11 and LG12 can be simplified. For example, in order to form a linear intensity distribution as shown in FIG. 3A, optical design for adjusting the light emission characteristics of the light guide is desired by a silk screen printing method or the like. In other words, in a case where the attenuation rate of the source light is, for example, 0.9, the intensity change is based on the hyperbolic-curve characteristic such as 90%, 81%, and 73%, and accordingly, the intensity does not linearly change. Accordingly, in a case where the linear intensity distribution is formed as in FIG. 3A, the adjustment of the light emission characteristics such as a silk screen printing method or the like is desired.

However, according to the technique using one light guide LG as in the first configuration example illustrated in FIG. 4, it is difficult to perform such adjustment of the light emission characteristics. In other words, when the light emission characteristics are adjusted so as to allow the intensity change in the emitting light intensity distribution LID1 to be linear by processing the surface of the light guide, the intensity change in the emitting light intensity distribution LID2 becomes non-linear. On the other hand, when the light emission characteristics are adjusted so as to allow the intensity change in the emitting light intensity distribution LID2 to be linear by processing the surface of the light guide, the intensity change in the emitting light intensity distribution LID1 becomes non-linear.

From this point of view, according to the second configuration example illustrated in FIG. 5, the light guide LG11 is disposed in correspondence with the light source unit LS11, and the light guide LG12 is disposed in correspondence with the light source unit LS12. The light emission characteristics of the light guide LG11 may be adjusted by processing the surface thereof such that the intensity change in the emitting light intensity distribution LID1 is linear. On the other hand, the light emission characteristics of the light guide LG12 may be adjusted by processing the surface thereof such that the intensity change in the emitting light intensity distribution LID2 is linear. Accordingly, the optical design thereof can be simplified.

Furthermore, even in a case where the characteristics of the intensity change are not the linear characteristics as shown in FIG. 3A, but, for example, hyperbolic-curve characteristics or the like, such a case can be responded to by performing a correction process using software or the like. In other words, even in a case where linear characteristics are not optically formed, the characteristics can be adjusted to be linear by performing a correction process for the result of the light reception. Accordingly, in a case where such a correction process is performed, by employing a configuration in which two light guides as shown in FIG. 5 are not arranged, but only one light guide is arranged as shown in FIG. 4, downsizing of the optical detection device can be achieved.

In any of the first and second configuration examples shown in FIGS. 4 and 5, it is preferable that the light receiving unit RU is arranged at a position that is equally distant (or approximately equally distanced) from the emitting units EU1 and EU2. To be more specific, the light receiving unit RU is arranged such that a first distance from the arranged position PE1 of the emitting unit EU1 to the arranged position (a representative position or a center position) of the light receiving unit RU and a second distance from the arranged position PE2 of the emitting unit EU2 to the arranged position of the light receiving unit RU is the same (or approximately the same). By employing such a bilaterally-symmetric arrangement, a difference between the emitting light emitted from the emitting unit EU1 and the emitting light emitted from the emitting unit EU2 has monotonicity. Accordingly, in a case where the coordinates of the object are detected by allowing the light receiving unit RU to receive reflection light acquired by reflecting the emitting light off the object, the detection resolution of the amount of reception light in the light receiving unit RU can be maximally used, and accordingly, the accuracy of coordinate detection can be improved.

According to the optical detection device of this embodiment as above, the angle can be sensed by using concentric light guides having a curved shape. For example, by arranging two emitting units in common while the light receiving unit is used, an optical detection device that can be configured in a small package and can sense a broad range can be realized.

In addition, according to the optical detection device of this embodiment, since the light guide has a curved shape, the emitting light can be emitted in a radial pattern, and accordingly, the direction and the position, of an object can be detected in a broad range, compared to a case where a technique using a linear-shaped light guide is used. For example, according to a technique using a linear-shaped light guide, in order to enable detection in a broad range, the length of the light guide needs to be long, and the scale of the system is increased. In contrast to this, according to this embodiment, as shown in FIG. 1A, by arranging only an emitting unit having a small area of occupation, the direction and the position of an object can be detected in a broad range. In addition, according to the optical detection device of this embodiment, the detection system can be downsized, compared to a case where a technique in which light source units (emitting units) are disposed, for example, on the four corners of the display area is used. Furthermore, since the number of arranged emitting units, for example, is two, the degree of freedom of installation of the device can be increased. In addition, according to this embodiment, by arranging only the emitting unit to the upper side of the display area, for example, as shown in FIG. 1A, the direction and the position of an object can be detected. Accordingly, the installation of the device can be performed easily. In addition according to the technique in which the light source units are arranged on the four corners of the display area, there is a concern that the presence of the light source units arranged on the four corners may obstruct an image display on the display area. However, according to the optical detection device of this embodiment, the occurrence of such a situation can be suppressed.

4. Position Detecting Technique

Next, an example of a technique for detecting the position of an object using an optical detection device according to this embodiment will be described. FIG. 7A is an example of a signal waveform for controlling the light emission of the light source units LS11, LS12, LS21, and LS22 shown in FIGS. 4 and 5. A signal SLS11 is an emission control signal of the light source unit LS11 of the emitting unit EU1, and a signal SLS12 is an emission control signal of the light source unit LS12. The signals SLS11 and SLS12 have opposite phases. In addition, a signal SLS21 is an emission control signal of the light source unit LS21 of the emitting unit EU2, and a signal SLS22 is an emission control signal of the light source unit LS22. The signals SLS21 and SLS22 have opposite phases.

For example, the light source unit LS11 of the emitting unit EU1 is turned on (emits light) in a case where the signal SLS11 is at the H level and is turned off in a case where the signal SLS11 is at the L level. In addition, the light source unit LS12 is turned on (emits light) in a case where the signal SLS12 is at the H level and is turned off in a case where the signal SLS12 is at the L level. Accordingly, the light source unit LS11 and the light source unit LS12 are alternately turned on during a first period T1 shown in FIG. 7A. In other words, the light source unit LS12 is turned off during a period during which the light source unit LS11 is turned on. Accordingly, the emitting light intensity distribution LID1 as shown in FIG. 2A is formed. On the other hand, the light source unit LS11 is turned off during a period during which the light source unit LS12 is turned on. Accordingly, the emitting light intensity distribution LID2 as shown in FIG. 2B is formed.

On the other hand, the light source unit LS21 of the emitting unit EU2 is turned on in a case where the signal SLS21 is at the H level and is turned off in a case where the signal SLS21 is at the L level. In addition, the light source unit LS22 is turned on in a case where the signal SLS22 is at the H level and is turned off in a case where the signal SLS22 is at the L level. Accordingly, the light source unit LS21 and the light source unit LS22 are alternately turned on during a second period T2 shown in FIG. 7A. In other words, the light source unit LS22 is turned off during a period during which the light source unit LS21 is turned on. Accordingly, the emitting light intensity distribution LID1 as shown in FIG. 2A is formed. On the other hand, the light source unit LS21 is turned off during a period during which the light source unit LS22 is turned on. Accordingly, the emitting light intensity distribution LID2 as shown in FIG. 2B is formed.

As above, the control unit 60 shown in FIG. 1A allows the light source unit LS11 and the light source unit LS12 to alternately emit light (be turned on) during the first period T1. During this first period T1, the direction DDB1, in which an object is located, seen from the emitting unit EU1 is detected. To be more specific, for example, the light emission control under which Ga/Gb=1 and a value acquired by adding the control amounts Ia and Ib is constant as in the above-described Equations (6) and (7) is performed during the first period T1. Then, as illustrated in FIGS. 4 and 5, the direction DDB1 (angle θ1) in which the object OB is located is acquired. For example, the ratio fa/fb between the attenuation coefficients is acquired from Equations (10) and (11), and the direction DDB1 of the target object OB is acquired by using the technique described with reference to FIGS. 3A and 3B.

On the other hand, the control unit 60 allows the light source unit LS21 and the light source unit LS22 to alternately emit light during the second period T2 following the first period T1. During this second period T2, the direction DDB2, in which an object is located, seen from the emitting unit EU2 is detected. To be more specific, for example, the light emission control under which Ga/Gb=1 and a value acquired by adding the control amounts Ia and Ib is constant as in the above-described Equations (6) and (7) is performed during the second period T2. Then, as illustrated in FIGS. 4 and 5, the direction DDB2 (angle θ2) in which the object OB is located is acquired. For example, the ratio fa/fb between the attenuation coefficients is acquired from Equations (10) and (11), and the direction DDB2 of the target object OB is acquired by using the technique described with reference to FIGS. 3A and 3B.

As above, the control unit 60 controls light emission of the light source units LS11 and LS12 such that the detected amount Ga of the light reception of the light receiving unit RU during the first light emission period during which the light source unit LS11 emits light and the detected amount Gb of the light reception of the light receiving unit RU during the second light emission period during which the light source unit LS12 emits light are the same. Accordingly, the detection unit 50 acquires the direction DDB1 of the object OB with respect to the emitting unit EU1. In addition, the control unit 60 controls light emission of the light source units LS21 and LS22 such that the detected amount Ga of the light reception of the light receiving unit RU during the third light emission period during which the light source unit LS21 emits light and the detected amount Gb of the light reception of the light receiving unit RU during the fourth light emission period during which the light source unit LS22 emits light are the same. Accordingly, the detection unit 50 acquires the direction DDB2 of the object OB with respect to the emitting unit EU2.

Then, in this embodiment, the position POB of the object OB is acquired based on the direction DDB1 (the first direction) and the direction DDB2 (the second direction) of the object OB that have been acquired as above and a distance DS between the emitting units EU1 and EU2. Accordingly, the position POB of the object OB can be specified based on the detected directions DDB1 and DDB2 and the known distance DS. Therefore, the position POB can be acquired by performing a simple process.

5. Setting Range of Emitting Direction and Arrangement of Light Source Unit

Although a case is shown as an example in FIGS. 4 and 5 in which the light guide has an arc shape having a center angle of 180 degrees, and the range of emitting direction of the emitting light is 180 degrees, this embodiment is not limited thereto. Thus, the range of the emitting direction may be less than 180 degrees. For example, by setting the range of the emitting direction of the emitting unit to a range that is optimized in accordance with the positional relationship with respect to the detection area, the emitting light intensity distribution can be easily set, and the emitting light intensity distribution can be set to an optimal distribution.

Figure 8:
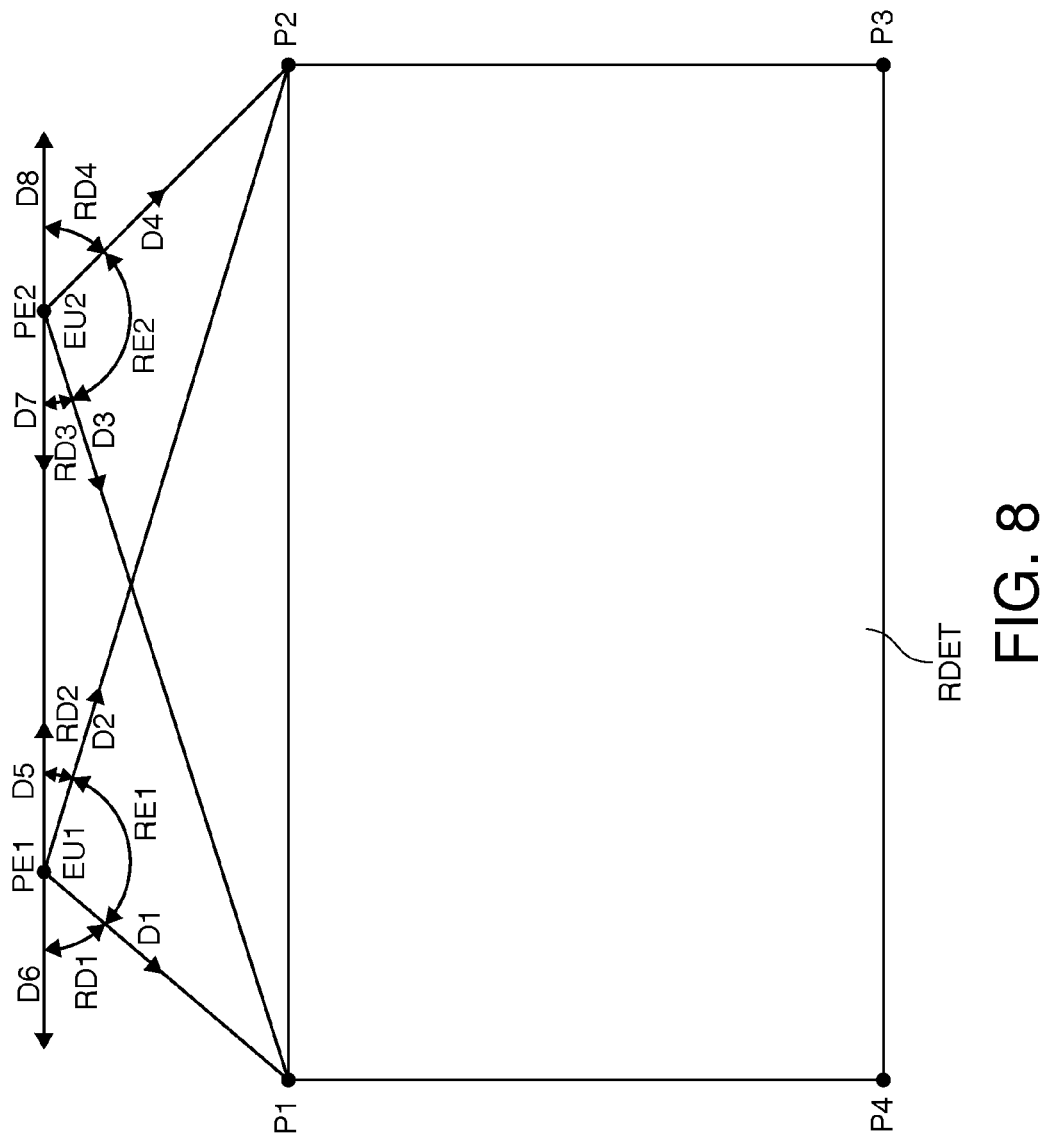
FIG. 8 is an explanatory diagram illustrating the direction range of an arrangement of a light source unit and the range of the emitting direction.

For example, in FIG. 8, the detection area RDET of an object is, for example, a rectangular area (a rectangular area seen in the Z direction) that is defined by first to fourth positions P1 to P4. Here, a direction from the first arrangement position PE1, which is the arrangement position of the emitting unit EU1, toward the first position P1, which is disposed on one end side, defining the detection area RDET is represented as a first direction D1. In addition, a direction from the first arrangement position PE1 toward the second position P2, which is located on the other end side, defining the detection area RDET is represented as a second direction D2. A direction from the second arrangement position PE2, which is the arrangement position of the emitting unit EU1, toward the first position P1 is represented as a third direction D3. In addition, a direction from the second arrangement position PE2 toward the second position P2 is represented as a fourth direction D4. Here, the first and second positions P1 and P2 are the positions of apexes, which are on a side (upper side) located on the side of the emitting units EU1 and EU2, out of the first position P1 to the fourth position P4 that define the detection area RDET.

In this case, in FIG. 8, the emitting unit EU1 emits emitting light (first emitting light) in the range (a first emitting direction range) of the emitting direction including a direction range RE1 that is defined by the first direction D1 and the second direction D2. For example, the range of the emitting direction is a range of the emitting direction in which the emitting light is emitted in at least the direction range RE1, and the emitting light is emitted in the range of the emitting direction that is less than 180 degrees.

In addition, the emitting unit EU2 emits emitting light (second emitting light) in the range (a second emitting direction range) of the emitting direction including a direction range RE2 that is defined by the third direction D3 and the fourth direction D4. For example, the range of the emitting direction is a range of the emitting direction in which the emitting light is emitted in at least the direction range RE2, and the emitting light is emitted in the range of the emitting direction that is less than 180 degrees.

For example, a direction from the first arrangement position PE1 toward the second arrangement position PE2 is represented as a fifth direction D5, and a direction opposite to the fifth direction D5 is represented as a sixth direction D6. In addition, a direction from the second arrangement position PE2 toward the first arrangement position PE1 is represented as a seventh direction D7, and a direction opposite to the seventh direction D7 is represented as an eighth direction D8.

In this case, in FIG. 8, the first light source unit LS11 of the emitting unit EU1 shown in FIGS. 4 and 5 is arranged within the first direction range RD1 that is defined by the first direction D1 and the sixth direction D6. For example, the light source unit LS11 is arranged within a direction range that is defined by a direction of the bisection of an angle formed by the first and sixth directions D1 and D6 and the first direction D1.

In addition, the second light source unit LS12 of the emitting unit EU1 is arranged within the second direction range RD2 that is defined by the second direction D2 and the fifth direction D5. For example, the light source unit LS12 is arranged within a direction range that is defined by a direction of the bisection of an angle formed by the second and fifth directions D2 and D5 and the second direction D2. In other words, in the emitting unit EU1, the shapes and the arrangements of the light source units LS11 and LS12 and the light guide LG1 (LG11 and LG12) are set such that the light source units LS11 and LS12 are located within the first and second direction ranges RD1 and RD2.

On the other hand, the third light source unit LS21 of the emitting unit EU2 is arranged within the third direction range RD3 that is defined by the third direction D3 and the seventh direction D7. For example, the light source unit LS21 is arranged within a direction range that is defined by a direction of the bisection of an angle formed by the third and seventh directions D3 and D7 and the third direction D3.

In addition, the fourth light source unit LS22 of the emitting unit EU2 is arranged within the fourth direction range RD4 that is defined by the fourth direction D4 and the eighth direction D8. For example, the light source unit LS22 is arranged within a direction range that is defined by a direction of the bisection of an angle formed by the fourth and eighth directions D4 and D8 and the fourth direction D4. In other words, in the emitting unit EU2, the shapes and the arrangements of the light source units LS21 and LS22 and the light guide LG2 (LG21 and LG22) are set such that the light source units LS21 and LS22 are located within the third and fourth direction ranges RD3 and RD4.

When the ranges of the emitting directions of the emitting units EU1 and EU2 and the arrangement of the light source unit are set as illustrated in FIG. 8, at least an object that is present in the detection area RDET can be appropriately detected. In addition, since the range of the emitting direction is set to a direction range less than 180 degrees, emission of the emitting light in an unnecessary emitting direction can be suppressed. Accordingly, the emitting light intensity distribution can be set easily.

In other words, in FIG. 8, even when emitting light is emitted in the direction ranges RD1, RD2, RD3, and RD4, the emitting light does not contribute to the detection of an object in the detection area RDET. Accordingly, when the emitting light is emitted in the direction ranges RD1, RD2, RD3, and RD4, the power of the emitting light is unnecessarily consumed.

In addition, in FIG. 8, it is preferable that the emitting unit EU1 has an intensity distribution in which the intensity of the emitting light changes as shown in FIG. 3A, for example, within the range from the direction D1 to the direction D2 for detection of an object. In addition, it is preferable that the emitting unit EU2 has an intensity distribution in which the intensity of the emitting light changes as shown in FIG. 3A, for example, within the range from the direction D3 to the direction D4 for detection of an object.

However, the range of the emitting direction of the emitting unit EU1 is 180 degrees, and the emitting unit EU1 has an intensity distribution in which the intensity of the emitting light changes in the range from the direction D6 to the direction D5. In addition, the emitting unit EU2 has an intensity distribution in which the intensity of the emitting light changes in the range from the direction D7 to the direction D8. Accordingly, it is difficult to set the emitting light intensity distribution to an intensity distribution that is optimal for detection of an object.

From this viewpoint, according to the technique illustrated in FIG. 8, for example, the intensity distribution of the emitting unit EU1 can be set such that the intensity of the emitting light changes in the range from the direction D1 to the direction D2. In addition, the intensity distribution of the emitting unit EU2 can be set such that the intensity of the emitting light changes in the range from the direction D3 to the direction D4. Accordingly, the emitting light intensity distribution can be easily set to an intensity distribution that is optimal for detecting an object in the detection area RDET, and therefore an improvement in the detection accuracy can be achieved.

In addition, when the light source units LS11, LS12, LS21, LS22 are arranged within the direction ranges RD1, RD2, RD3, and RD4, a situation in which the power of source light emitted from the light source units is unnecessarily consumed by the light guides can be suppressed. In addition, by suppressing such unnecessary consumption, the power of the emitting light emitted to the object is consequently increased, whereby an improvement in the detection accuracy can be achieved.

6. Regulating Emitting Direction

In a case where an object such as a finger of a user is detected by setting a detection area RDET as shown in FIG. 1B, when the emitting light emitted from the emitting units EU1 and EU2 is spread in the Z direction shown in FIG. 1B, incorrect detection may occur. In other words, while a finger of a user is a detection object, the body side of the user may be detected. For example, in FIG. 1A, in a case where the body of the user is close to the screen 20 side, when the finger of the user as the detection object is present in the detection area RDET, the object may be incorrectly detected.

Thus, according to the optical detection device of this embodiment, an emitting direction regulating unit (an emitting direction limiting unit) is arranged which regulates the emitting direction of the emitting light to be a direction along the surface (a surface parallel to the XY plane) of the detection area RDET of an object. To be more specific, in FIG. 9A, the emitting direction regulating unit is implemented by a slit SL. This slit SL has a first slit face SFL1 and a second slit face SFL2 that are formed along the surface of the detection area RDET. As above, according to this embodiment, by disposing the slit SL, which is opened in the emitting direction, in the casing HS of the optical detection device, the emitting direction regulating unit of the optical detection device is realized.

By creating such a slit SL, light traveling from the light guide LG (LG11 and LG12) is regulated to be in the direction along the slit faces SFL1 and SFL2. Accordingly, the emitting light emitted from the emitting units EU1 and EU2 shown in FIG. 1B can be regulated to be light parallel to the XY plane. Thus, the emitting light irradiating the detection area RDET can be prevented from spreading in the Z direction. Accordingly, in a case where the body of a user is close to the screen 20, the body of the user can be prevented from being incorrectly detected as an object such as a finger, a touch pen, or the like. Therefore, the position of the object can be correctly detected without arranging a device that detects the position in the Z direction.

Figure 9A:
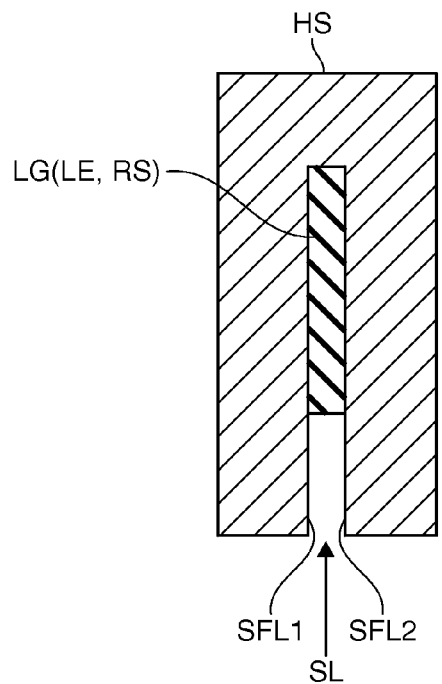
FIGS. 9A and 9B are explanatory diagrams of an emitting direction regulating unit.
Figure 9B:
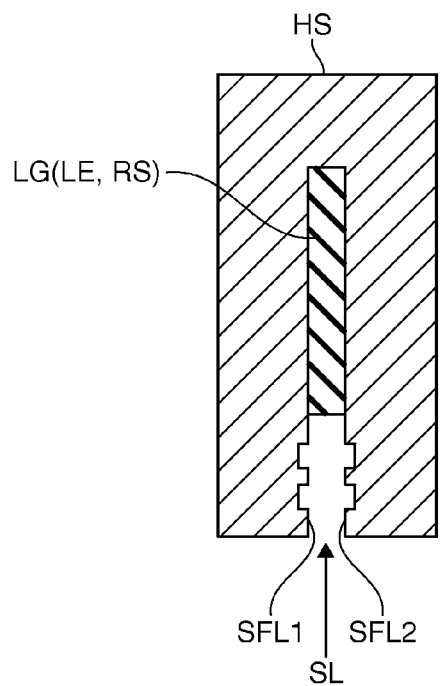

In FIG. 9B, concave portions are formed in the slit faces SFL1 and SFL2. In other words, although the slit faces SFL1 and SFL2 have a flat shape in FIG. 9A, the slit faces SFL1 and SFL2 shown in FIG. 9B do not have a flat shape, and instead depressions are formed therein. By creating such concave portions, the surface reflection at the slit faces SFL1 and SFL2 can be suppressed. Accordingly, emitting light that is more parallel to the XY plane can be output to the detection area RDET.

In addition, by performing a process such as applying a nonreflecting coating on the surfaces of the slit faces SFL1 and SFL2, the same function as that of the concave portions can be realized. In FIGS. 9A and 9B, a case where the emitting direction regulating unit that regulates the blurring of the emitting light in the Z direction is implemented by the slit SL is shown. However, for example, the emitting direction regulating unit may be implemented by using an optical sheet such as a louver film. For example, the louver film LF shown in FIG. 2A has a function of regulating the direction of the directivity of the light output from the light guide LG to be the direction of the normal line. Accordingly, in order to realize the same function as that of the emitting direction regulating unit through the slit SL, a louver film may be disposed which has a configuration of the arrangement for regulating the output direction of light from the light guide LG to be a direction parallel to the XY plane shown in FIG. 1B.

7. Detailed Example of the Structure of the Emitting Unit

Figure 10:
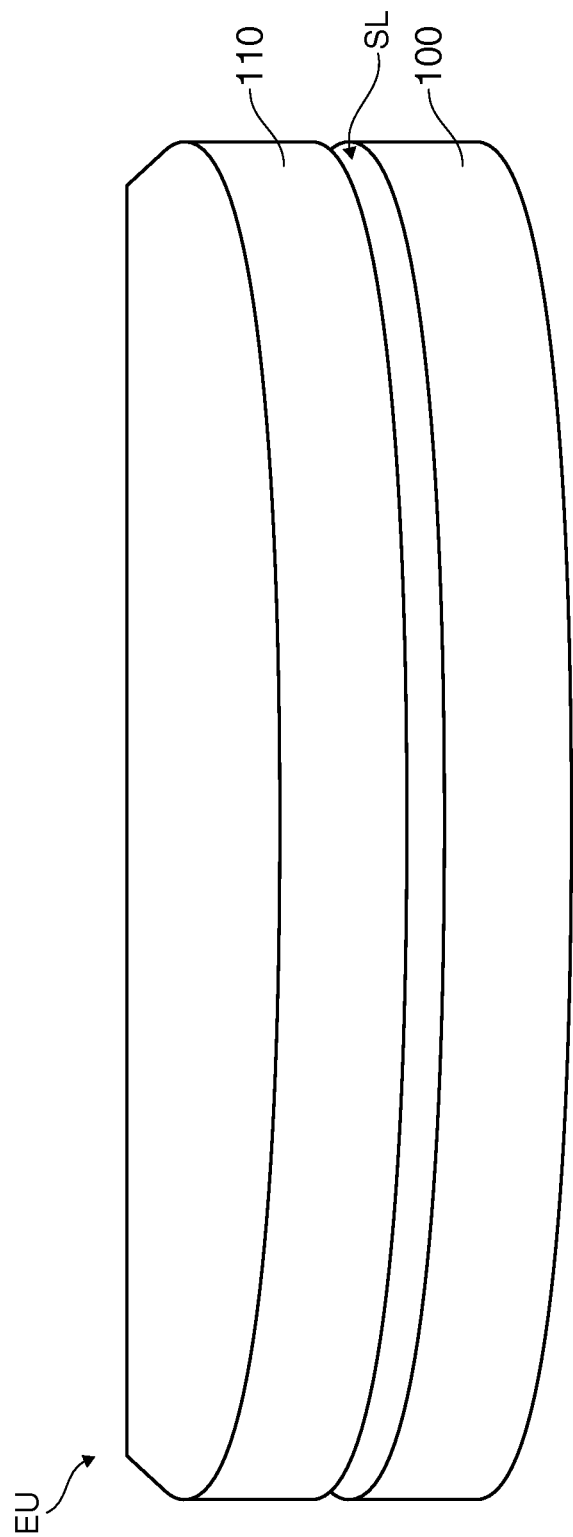
FIG. 10 is a detailed example of the configuration of an emitting unit.
Figure 11:
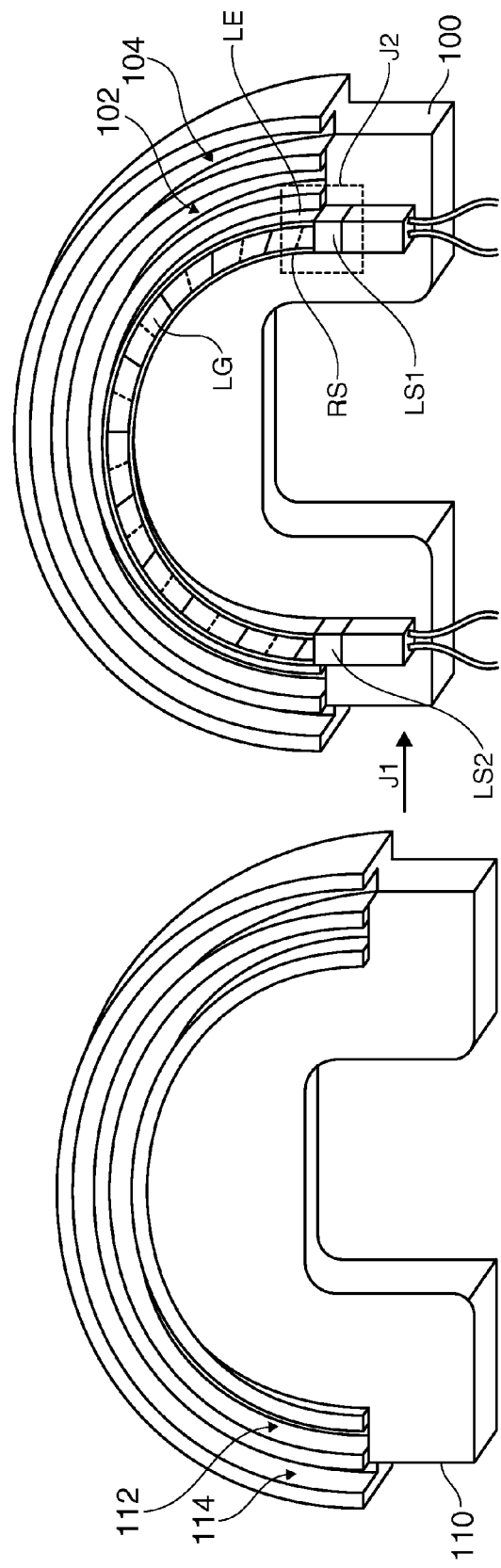
FIG. 11 is a detailed example of the configuration of an emitting unit.
Figure 12:
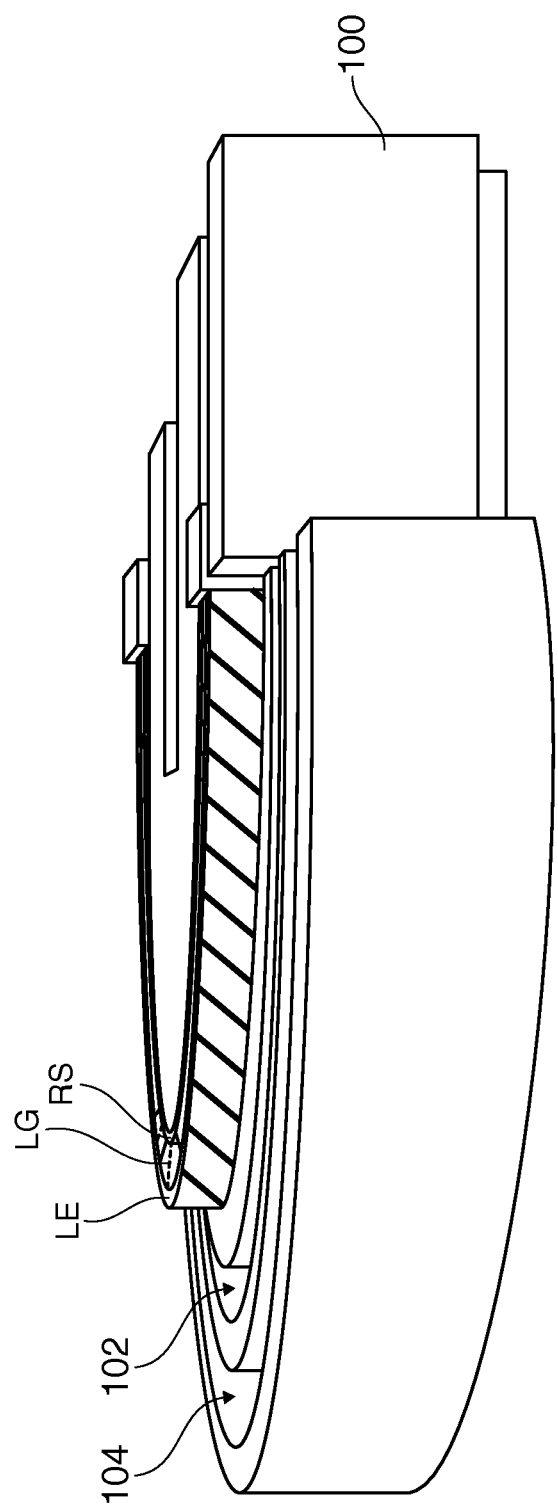
FIG. 12 is a detailed example of the configuration of an emitting unit.

Next, a detailed structure example of the emitting unit of an optical detection device according to this embodiment will be described with reference to FIGS. 10 to 12. FIGS. 10 to 12 are diagrams illustrating a detailed structure of the emitting unit described with reference to FIG. 4.

Hereinafter, for simplification of the description, each of the emitting units EU1 and EU2 shown in FIG. 4 will be described as an emitting unit EU. In addition, the light guides LG1 and LG2 shown in FIG. 4 will be described as a light guide LG, the light source units LS11 and L521 will be described as a light source unit LS1, and the light source units LS21 and LS22 will be described as a light source unit LS2. This applies the same to the reflection sheets RS1 and RS2, and the emitting direction setting units LE1 and LE2.

FIG. 10 is a perspective view of the emitting unit EU (EU1 or EU2) seen from the opening side of the slit SL. This emitting unit EU is configured by fan-shaped casings 100 and 110. FIG. 11 is a perspective view of the casings 100 and 110 seen from the inner face by separating the fan-shaped casings 100 and 110 configuring the emitting unit EU. FIG. 12 is a perspective view of the casing 100 seen from the direction J1 shown in FIG. 11. As shown in FIGS. 10, 11, and 12, the emitting unit EU has a structure in which the fan-shaped casings 100 and 110 overlap each other so as to allow the inner faces thereof face each other.

As shown in FIGS. 11 and 12, arc-shaped groove portions 102 and 104 are formed in the inner face of the casing 100, and arc-shaped groove portions 112 and 114 are formed in the inner face of the casing 110. The groove portions 102 and 112 are groove portions that are formed on the inner circumferential side, and the groove portions 104 and 114 are groove portions that are formed on the outer circumferential side. By forming such groove portions 102, 104, 112, and 114 in the casings 100 and 102, the concave portions of the slit faces SFL1 and SFL2 described with reference to FIG. 9B are implemented.

As shown in FIGS. 11 and 12, the light guide LG is arranged on the inner circumferential side of the groove portion 102. In addition, an emitting direction setting unit LE (a prism sheet, a louver film, or the like) is arranged on the outer circumferential side of the light guide LG. A reflection sheet RS is arranged on the inner circumferential side of the light guide LG. By employing such a configuration, the emitting light output from the outer circumferential side of the light guide LG is set in a direction that is the direction of the normal line by the emitting direction setting unit LE and is output from the slit SL of the emitting unit EU. At this time, the direction of the emitting light is regulated by the emitting direction regulating unit that is implemented by the groove portions 102, 104, 112, and 114 so as to be along the surface (a surface parallel to the XY plane) of the detection area RDET shown in FIG. 1B.

Figure 13A:
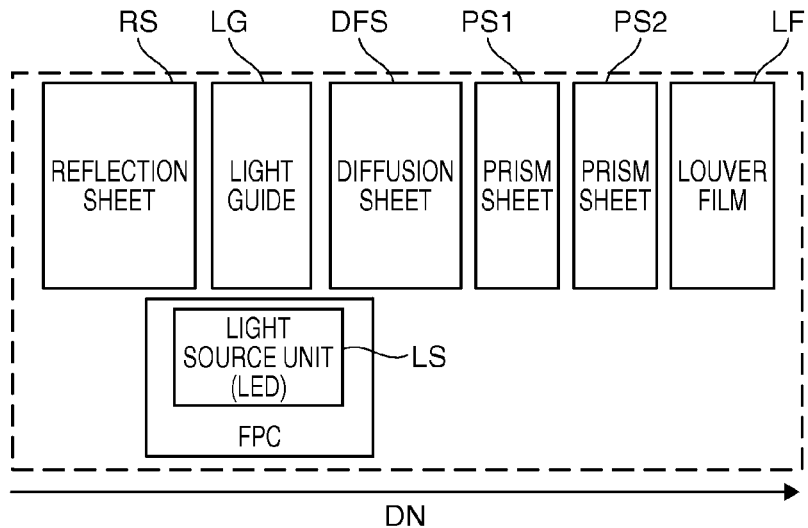
FIGS. 13A and 13B are explanatory diagrams of an emitting-direction setting unit.
Figure 13B:
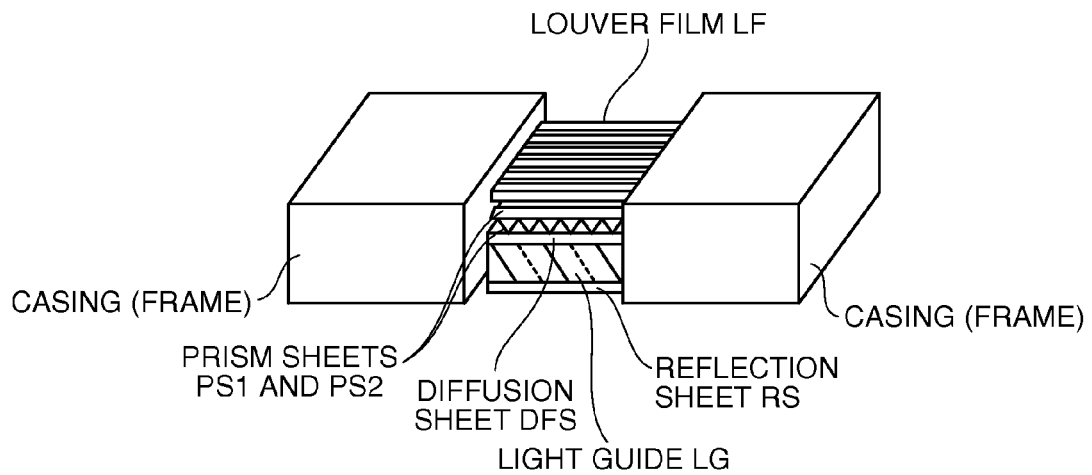

FIGS. 13A and 13B are diagrams illustrating a detailed structure of a portion denoted by J2 shown in FIG. 11.

As shown in FIG. 13A, the light emitted from the light source unit LS (LS1 or LS2) that is arranged in an FPC (flexible printed circuit board) is incident to the light incident surface of the light guide LG. A reflection sheet RS is disposed on the inner circumferential side of the light guide LG, and a diffusion sheet DFS is disposed on the outer circumferential side thereof. A prism sheet PS1 is disposed on the outer circumferential side of the diffusion sheet DFS, a prism sheet PS2 is disposed on the outer circumferential side of the prism sheet PS1, and a louver film LF is disposed on the outer circumferential side of the prism sheet PS2. In addition, as shown in FIG. 13B, the prism sheets PS1 and PS2 are arranged so as to allow the edge lines thereof to be orthogonal to each other.

In FIGS. 13A and 13B, the surface luminance of light output from the outer circumferential side of the light guide LG is made uniform by the diffusion sheet DFS. In other words, by passing light through the diffusion sheet DFS, the output light becomes diffused light having uniform luminance.

The prism sheets PS1 and PS2 have a function of collecting the light output from the outer circumferential side of the diffusion sheet DFS to be in a direction DN (the direction of the normal line) from the inner circumferential side toward the outer circumferential side of the light guide LG. In other words, after the surface luminance is made uniform by the diffusion sheet DFS, the light is collected in the direction DN by the prism sheets PS1 and PS2 so as to improve the luminance.

The louver film LF is a lattice-shaped light shielding member that shields light, which is output from the outer circumferential side of the prism sheets PS1 and PS2, having a low viewing angle. By disposing the louver film LF, the light traveling in the direction DN passes through the louver film LF so as to be output from the emitting unit EU to the outer circumferential side, and the light having a low viewing angle is blocked.

Figure 14A:
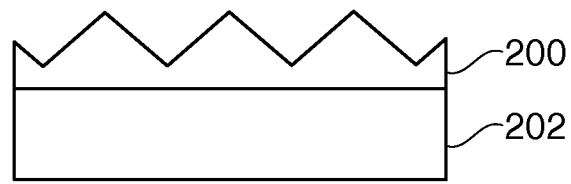
FIGS. 14A to 14C are explanatory diagrams of a prism sheet and a diffusion sheet.

FIG. 14A shows an example of the prism sheet PS (PS1 or PS2). The prism surface 200 of the prism sheet PS, for example, is formed by an acrylic resin layer 200, and a substrate 202, for example, is formed by a polyester film layer 202.

Figure 14B:
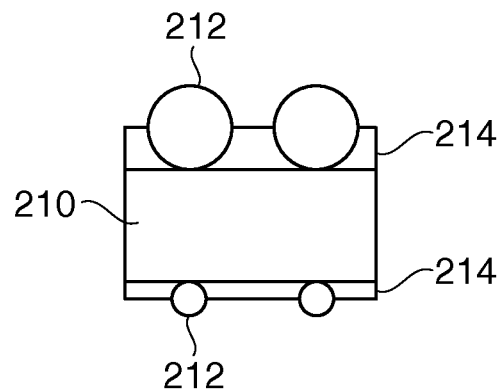
Figure 14C:

FIGS. 14B and 14C show an example of the diffusion sheet DFS. This diffusion sheet DFS is formed by coating a base film 210 (PET) with beads 212 together with a binder 214.

Accordingly, a diffusion sheet DFS having a concave-convex surface as shown in FIG. 14C can be formed.

Figure 15:
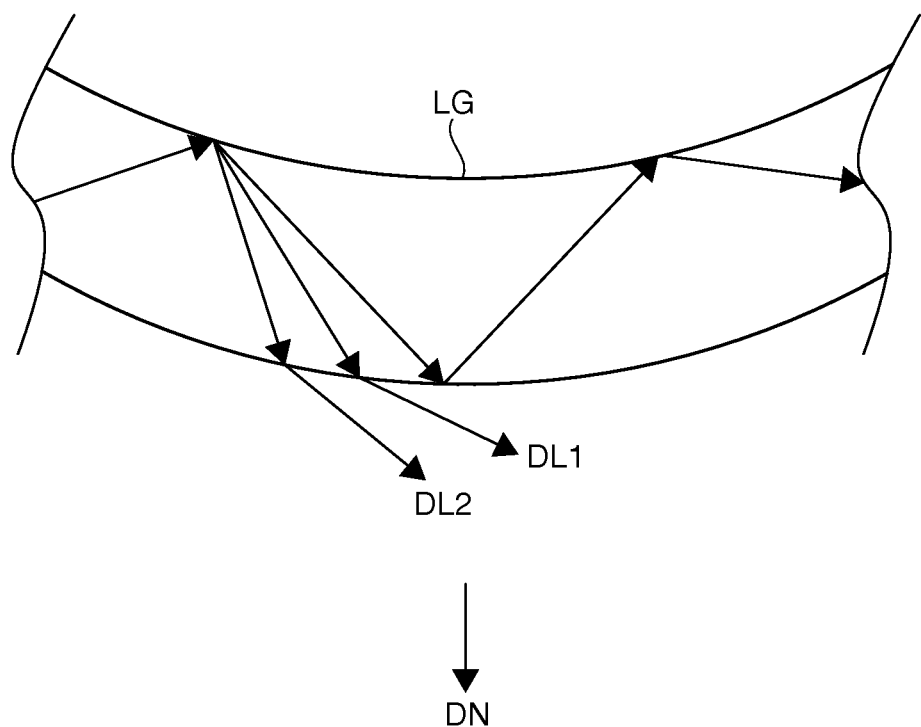
FIG. 15 is an explanatory diagram illustrating a technique for setting an emitting direction.

FIG. 15 is a diagram illustrating the function of the emitting light setting unit LE that is implemented by the prism sheet PS and the louver film LF.

As shown in FIG. 15, in a case where source light is guided inside the light guide LG through total reflection, by performing a surface process by using a silk screen printing method or the like, for example, for the inner circumferential side of the light guide LG, a part of the source light is output from the outer circumferential side of the light guide LG. The emitting light setting unit LE that is implemented by the prism PS and the louver film LF sets the directions DL1 and DL2 of the light output as above faces the direction DN (the direction of the normal line). Accordingly, it is possible to form the emitting light intensity distributions LID1 and LID2 as shown in FIGS. 2A and 2B.

8. Detection Unit

Figure 16:
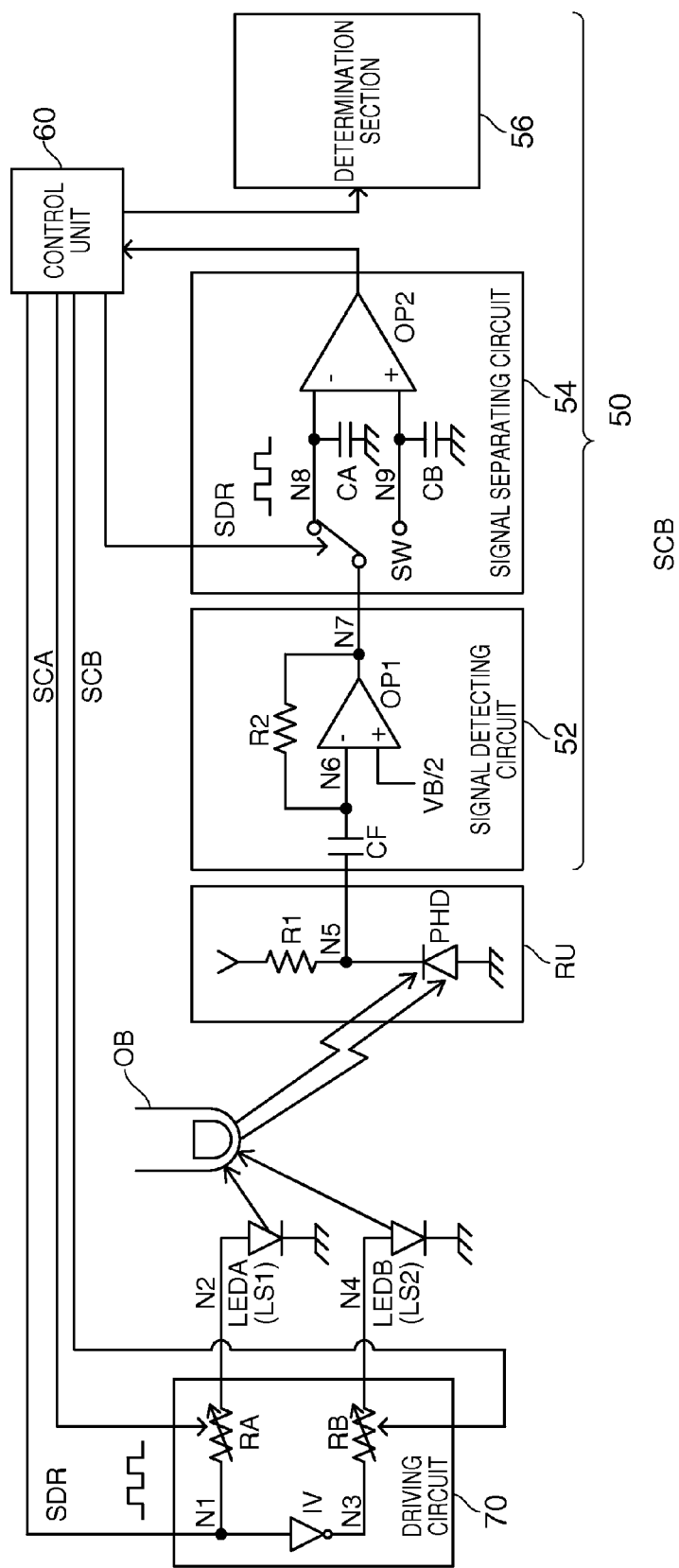
FIG. 16 is a detailed example of the configuration of a detection unit.

Next, a detailed example of the configuration of the detection unit 50 will be described with reference to FIG. 16.

A driving circuit 70 includes a light emitting device LEDA of the light source unit LS1 and a light emitting device LEDB of the light source unit LS2. This driving circuit 70 includes variable resistors RA and RB and an inverter circuit IV. A driving signal SDR having a rectangular waveform is input from a control unit 60 to one end of the variable resistor RA and the inverter circuit IV. The variable resistor RA is disposed between the input node N1 of the signal SDR and a node N2 disposed on the anode-side of the light emitting device LEDA. The variable resistor RB is disposed between the output node N3 of the inverter circuit IV and a node N4 disposed on the anode-side of the light emitting device LEDB. The light emitting device LEDA is disposed between the node N2 and GND (VSS), and the light emitting device LEDB is disposed between the node N4 and GND.

During a first light emission period TA during which the driving signal SDR is at the H level, a current flows through the light emitting device LEDA through the variable resistor RA, and accordingly, the light emitting device LEDA emits light. Accordingly, the emitting light intensity distribution LID1 as shown in FIG. 2A is formed. During a second light emission period TB during which the driving signal SDR is at the L level, a current flows through the light emitting device LEDB through the variable resistor RB, and accordingly, the light emitting device LEDB emits light. Accordingly, the emitting light intensity distribution LID2 as shown in FIG. 2B is formed. Therefore, as described with reference to FIG. 7A, by alternately turning on the light source units LS1 and LS2, the emitting light intensity distributions LID1 and LID2 shown in FIGS. 2A and 2B can be formed during the first and second light emission periods TA and TB. In other words, the control unit 60 alternately forms the emitting light intensity distribution LID1 and the emitting light intensity distribution LID2 by alternately turning on the light source unit LS1 and the light source unit LS2 using the driving signal SDR.

The light receiving unit RU includes a light receiving device PHD that is implemented by a photo diode or the like and a resistor R1 that is used for current-to-voltage conversion. During the first light emission period TA, reflection light, which is reflected from an object OB, according to the light emitted from the light emitting device LEDA is incident to the light receiving device PHD, and a current flows through the resistor R1 and the light receiving device PHD so as to generate a voltage signal at a node N5. On the other hand, during the second light emission period TB, reflection light, which is reflected from the object OB, according to the light emitted from the light emitting device LEDB is incident to the light receiving device PHD, and a current flows through the resistor R1 and the light receiving device PHD so as to generate a voltage signal at the node N5.

The detection unit 50 includes a signal detecting circuit 52, a signal separating circuit 54, and a determination section 56.

The signal detecting circuit 52 (a signal extracting circuit) includes a capacitor CF, an operational amplifier OP1, and a resistor R2. The capacitor CF serves as a high-pass filter that cuts off a DC component (direct current component) of the voltage signal applied at the node N5. By disposing such a capacitor CF, a low-frequency component or a DC component due to environmental light can be cut off, and accordingly, the detection accuracy can be improved. A DC bias setting circuit that is configured by the operational amplifier OP1 and the resistor R2 is a circuit that is used for setting a DC bias voltage (VB/2) for an AC signal after cutting off the DC component.

The signal separating circuit 54 includes a switch circuit SW, capacitors CA and CB, and an operational amplifier OP2. During the first light emission period TA during which the driving signal SDR is at the H level, the switch circuit SW connects the output node N7 of the signal detecting circuit 52 to a node N8 disposed on the inverted-input side (−) of the operational amplifier OP2. On the other hand, during the second light emission period TB during which the driving signal SDR is at the L level, the switch circuit SW connects the output node N7 of the signal detecting circuit 52 to a node N9 disposed on the non-inverted input side (+) of the operational amplifier OP2. The operational amplifier OP2 compares the voltage signal (effective voltage) applied at the node N8 and the voltage signal (effective voltage) applied at the node N9.

Then, the control unit 60 controls the resistance values of the variable resistors RA and RB of the driving circuit 70 based on the result of comparison of the voltage signals (effective voltages), which is acquired by the signal separating circuit 54, applied at the nodes N8 and N9. The determination section 56 determines the position of the object based on the result of control of the resistance values of the variable resistors RA and RB that is acquired by the control unit 60.

In this embodiment, the control operation described with reference to the above-described Equations (6) and (7) is realized by the detection unit 50 shown in FIG. 16. In other words, when the detected amount of received light of the light receiving device PHD during the first light emission period TA is denoted by Ga, and the detected amount of received light of the light receiving device PHD during the second light emission period TB is denoted by Gb, the control unit 60 controls the resistance values of the variable resistors RA and RB based on the comparison result of the signal separating circuit 54 such that the ratio Ga/Gb between the detected amounts of received light is one.

In other words, the control unit 60 controls light emission of the light source units LS1 and LS2 such that the detected amount Ga of received light of the light receiving unit RU during the first light emission period TA during which the light source unit LS1 emits light and the detected amount Gb of received light of the light receiving unit RU during the second light emission period TB during which the light source unit LS2 emits light are the same.

For example, in a case where the detected amount Ga of received light during the first light emission period TA is larger than the detected amount Gb of received light during the second light emission period TB, the control unit 60 increases the resistance value of the variable resistor RA so as to decrease the value of the current flowing through the light emitting device LEDA. In addition, the control unit 60 decreases the resistance value of the variable resistor RB so as to increase the value of the current flowing through the light emitting device LEDB. Accordingly, the detected amount Ga of received light of the light receiving device PHD during the first light emission period TA decreases, and the detected amount Gb of received light of the light receiving device PHD during the second light emission period TB increases, whereby Ga and Gb are controlled such that Ga/Gb=1.

On the other hand, in a case where the detected amount Gb of received light during the second light emission period TB is larger than the detected amount Ga of received light during the first light emission period TA, the control unit 60 decreases the resistance value of the variable resistor RA so as to increase the value of the current flowing through the light emitting device LEDA. In addition, the control unit 60 increases the resistance value of the variable resistor RB so as to decrease the value of the current flowing through the light emitting device LEDB. Accordingly, the detected amount Ga of received light of the light receiving device PHD during the first light emission period TA increases, and the detected amount Gb of received light of the light receiving device PHD during the second light emission period TB decreases, whereby Ga and Gb are controlled such that Ga/Gb=1. In addition, in the case of Ga=Gb, the resistance values of the variable resistors RA and RB are not changed.

Accordingly, the amounts of emitted light of the light emitting devices LEDA and LEDB of the light source units LS1 and LS2 are controlled such that the intensities INTa and INTb shown in FIG. 3A are the same at the position of the object. Then, based on the resistance values of the variable resistors RA and RB at a time when the above-described light emission control operation is performed, the position of the object is detected by using the technique described with reference to the above-described Equations (6) to (11). Accordingly, the effects of the external disturbing light such as environmental light can be suppressed to a minimum level, and therefore the detection accuracy of the position of an object can be improved.

In addition, the light emission controlling technique of this embodiment is not limited to the technique described with reference to FIG. 16, and various modifications can be made therein. For example, a technique may be used in which the light emitting device LEDB shown in FIG. 16 is used as a light emitting device of a reference light source unit. This reference light source unit is a light source unit that is arranged so as to be set such that the incidence of ambient light (external disturbing light, reflection light from an object, and the like) is regulated, for example, by being disposed at a position closer to the light receiving unit RU than other light source units (LS11 to LS22) or being disposed inside the casing of the light receiving unit RU. Then, the control unit 60 controls light emission of the first light source unit LS11 shown in FIGS. 4 and 5 and the reference light source unit such that the detected amounts of received light at the light receiving unit RU are the same by allowing the first light source unit LS11 and the reference light source unit, not shown in the figure, to alternately emit light during the first period. In addition, the control unit 60 controls light emission of the second light source unit LS12 and the reference light source unit such that the detected amounts of received light at the light receiving unit RU are the same by allowing the second light source unit LS12 and the reference light source unit to alternately emit light during the second period. In addition, the control unit 60 controls light emission of the third light source unit LS21 and the reference light source unit by allowing the third light source unit LS21 and the reference light source unit to alternately emit light such that the detected amounts of light reception in the light receiving unit RU are the same during the third period. The control unit 60 controls light emission of the fourth light source unit LS22 and the reference light source unit by allowing the fourth light source unit LS22 and the reference light source unit to alternately emit light such that the detected amounts of light reception in the light receiving unit RU are the same during the fourth period. Accordingly, the light emission is controlled such that the detected amount of light reception during the first light emission period in which the first light source unit LS11 emits light and the detected amount of the light reception during the second light emission period in which the second light source unit LS12 emits light are substantially the same through the reference light source unit. In addition, the light emission is controlled such that the detected amount of light reception during the third light emission period in which the third light source unit LS21 emits light and the detected amount of the light reception during the fourth light emission period in which the fourth light source unit LS22 emits light are substantially the same through the reference light source unit.

Although this embodiment has been described in detail as above, it is easily understood by those skilled in the art that various modifications can be made therein without substantially departing from the new matters and the advantages of the invention. Accordingly, all the modified examples are within to the scope of the invention. For example, a term that is written together with another term, which is a broader term or a synonymous term, at least once in the description presented here or the drawing can be replaced with the another term in any portion of the description or the drawings. In addition, the configurations and the operations of the optical detection device, the display device, and the electronic apparatus are not limited to those described in this embodiment, and various modifications can be made therein.

What is claimed is:
1. An optical detection device comprising:
   a first emitting unit that emits first emitting light in a radial pattern and having an intensity that differs in accordance with an emitting direction;
   a second emitting unit that emits second emitting light in a radial pattern and having an intensity that differs in accordance with an emitting direction;
   a light receiving unit that receives first reflection light acquired by reflecting the first emitting light emitted from the first emitting unit off an object and second reflection light acquired by reflecting the second emitting light emitted from the second emitting unit off the object; and
   a detection unit that detects a position of the object based on a result of the light reception in the light receiving unit,
   wherein the first emitting unit includes:
      a first light source unit that emits first source light;
      a second light source unit that emits second source light;
      a curve-shaped first light guide that includes surfaces including:
         a first light incident surface to which the first source light is incident, the first light incident surface being located on one end portion of the first light guide,
         a second light incident surface to which the second source light is incident, the second light incident surface being located on the other end portion of the first light guide, and a convex surface from which the first source light incident from the first light incident surface and the second source light incident from the second light incident surface are output; and a first emitting direction setting unit that receives the first source light or the second source light output from the convex surface of the first light guide and sets an emitting direction of the first emitting light to a direction of a normal line of the convex surface, and wherein the second emitting unit includes:

a third light source unit that emits third source light;

a fourth light source unit that emits fourth source light;

a curve-shaped second light guide that includes surfaces including:

a third light incident surface to which the third source light is incident, the third light incident surface being located on one end portion of the second light guide, a fourth light incident surface to which the fourth source light is incident, the fourth light incident surface being located on the other end portion of the second light guide, and a convex surface from which the third source light incident from the third light incident surface and the fourth source light incident from the fourth light incident surface are output; and a second emitting direction setting unit that receives the third source light or the fourth source light output from the convex surface of the second light guide and sets an emitting direction of the second emitting light to a direction of a normal line of the convex surface.

2. The optical detection device according to claim 1, wherein the first emitting unit and the second emitting unit are arranged so as to be separated from each other, and wherein the detection unit:

detects a first direction of the object with respect to the first emitting unit based on a result of the light reception of the first reflection light, detects a second direction of the object with respect to the second emitting unit based on a result of the light reception of the second reflection light, and detects the position of the object based on the first direction and the second direction, which are detected, and a distance between the first emitting unit and the second emitting unit.

3. A display device comprising the optical detection device according to claim 2.

4. An electronic apparatus comprising the optical detection according to claim 2.

5. The optical detection device according to claim 1, wherein a first emitting light intensity distribution is formed in a detection area of the object in accordance with emission of the first source light from the first light source unit of the first emitting unit, wherein a second emitting light intensity distribution, which is different from the first emitting light intensity distribution, is formed in the detection area in accordance with emission of the second source light from the second light source unit of the first emitting unit, wherein a third emitting light intensity distribution is formed in the detection area in accordance with emission of the third source light from the third light source unit of the second emitting unit, and wherein a fourth emitting light intensity distribution, which is different from the third emitting light intensity distribution, is formed in the detection area in accordance with emission of the fourth source light from the fourth light source unit of the second emitting unit.

6. The optical detection device according to claim 5, wherein the intensity of the emitting light decreases from one end portion toward the other end portion of the first emitting unit in first emitting light intensity distribution, wherein the intensity of the emitting light decreases from the other end portion toward the one end portion of the first emitting unit in the second emitting light intensity distribution, wherein the intensity of the emitting light decreases from one end portion toward the other end portion of the second emitting unit in the third emitting light intensity distribution, and wherein the intensity of the emitting light decreases from the other end portion toward the one end portion of the second emitting unit in the fourth emitting light intensity distribution.

7. The optical detection device according to claim 1, further comprising:

a control unit that controls light emission of the first light source unit, the second light source unit, the third light source unit, and the fourth light source unit, wherein the control unit causes the first light source unit and the second light source unit to alternately emit light during a first period and causes the third light source unit and the fourth light source unit to alternately emit light during a second period.

8. The optical detection device according to claim 1, further comprising:

a control unit that controls light emission of the first light source unit, the second light source unit, the third light source unit, and the fourth light source unit, wherein the control unit controls light emission of the first light source unit and the second light source unit such that a detected amount of light reception in the light receiving unit during a first light emission period in which the first light source unit emits light, and a detected amount of light reception in the light receiving unit during a second light emission period in which the second light source unit emits light are the same, and controls light emission of the third light source unit and the fourth light source unit such that a detected amount of light reception in the light receiving unit during a third light emission period in which the third light source unit emits light, and a detected amount of light reception in the light receiving unit during a fourth light emission period in which the fourth light source unit emits light are the same.

9. The optical detection device according to claim 1, wherein, in a case where a direction from a first arrangement position that is an arrangement position of the first emitting unit toward a first position located on one end portion that defines the detection area of the object is a first direction, a direction from the first arrangement position toward a second position located on the other end portion that defines the detection area is a second direction, a direction from a second arrangement position that is an arrangement position of the second emitting unit toward the first position is a third direction, a direction from the second arrangement position toward the second position is a fourth direction, a direction from the first arrangement position toward the second arrangement position is a fifth direction, a direction opposite to the fifth direction is a sixth direction, a direction from the second arrangement position toward the first arrangement position is a seventh direction, and a direction opposite to the seventh direction is an eighth direction, the first light source unit is arranged within a first direction range that is defined by the first direction and the sixth direction, the second light source unit is arranged within a second direction range that is defined by the second direction and the fifth direction, the third light source unit is arranged within a third direction range that is defined by the third direction and the seventh direction, and the fourth light source unit is arranged within a fourth direction range that is defined by the fourth direction and the eighth direction.

10. The optical detection device according to claim 1, wherein, in a case where a direction from a first arrangement position that is an arrangement position of the first emitting unit toward a first position located on one end portion that defines the detection area of the object is a first direction, a direction from the first arrangement position toward a second position located on the other end portion that defines the detection area is a second direction, a direction from a second arrangement position that is an arrangement position of the second emitting unit toward the first position is a third direction, and a direction from the second arrangement position toward the second position is a fourth direction, the first emitting unit emits the first emitting light in a first emitting direction range including a direction range that is defined by the first direction and the second direction, and the second emitting unit emits the second emitting light in a second emitting direction range including a direction range that is defined by the third direction and the fourth direction.

11. The optical detection device according to claim 1, wherein each of the first and second emitting units includes a slit that has a first slit face and a second slit face along a direction from the first emitting unit toward the second emitting unit.

12. The optical detection device according to claim 11, wherein concave portions are formed in the first slit face and the second slit face.

13. A display device comprising the optical detection device according to claim 1.

14. An electronic apparatus comprising the optical detection according to claim 1.

15. An optical detection device comprising:
  a first emitting unit that emits first emitting light in a radial pattern and having an intensity that differs in accordance with an emitting direction;
  a second emitting unit that emits second emitting light in a radial pattern and having an intensity that differs in accordance with an emitting direction;
  a light receiving unit that receives first reflection light acquired by reflecting the first emitting light emitted from the first emitting unit off an object and second reflection light acquired by reflecting the second emitting light emitted from the second emitting unit off the object; and
  a detection unit that detects a position of the object based on a result of the light reception in the light receiving unit,
  wherein the first emitting unit includes:
    a first light source unit that emits first source light;
    a second light source unit that emits second source light;
    a curve-shaped first light guide that includes surfaces including:
      a first light incident surface to which the first source light is incident, the first light incident surface being located on one end portion of the first light guide, and
      a convex surface from which the first source light incident from the first light incident surface is output;
    a curve-shaped second light guide that includes surfaces including:
      a second light incident surface to which the second source light is incident, the second light incident surface being located on other end portion of the second light guide, and
      a convex surface from which the second source light incident from the second light incident surface is output; and
    a first emitting direction setting unit that receives the first source light output from the convex surface of the first light guide or the second source light output from the convex surface of the second light guide and sets an emitting direction of the first emitting light to a direction of a normal line of the convex surfaces of the first light guide and the second light guide, and
  wherein the second emitting unit includes:
    a third light source unit that emits third source light;
    a fourth light source unit that emits fourth source light;
    a curve-shaped third light guide that includes surfaces including:
      a third light incident surface to which the third source light is incident, the third light incident surface being located on one end portion of the third light guide, and
      a convex surface from which the third source light incident from the third light incident surface is output;
    a curve-shaped fourth light guide that includes surfaces including:
      a fourth light incident surface to which the fourth source light is incident, the fourth light incident surface being located on other end portion of the fourth light guide, and
      a convex surface from which the fourth source light incident from the fourth light incident surface is output; and
    a second emitting direction setting unit that receives the third source light output from the convex surface of the third light guide or the fourth source light output from the convex surface of the fourth light guide and sets an emitting direction of the second emitting light to a direction of a normal line of the convex surface of the third light guide and the fourth light guide.

16. A display device comprising the optical detection device according to claim 15.

17. An electronic apparatus comprising the optical detection according to claim 4.

* * * * *